US00RE37197E

(19) United States
(12) Reissued Patent
Iida et al.

(10) Patent Number: US RE37,197 E
(45) Date of Reissued Patent: May 29, 2001

(54) DEVICE FOR REGENERATING PRINTED SHEET-LIKE RECORDING MEDIUM

(75) Inventors: Toru Iida, Tokyo; Michihito Ohashi, Kawasaki; Yoshihiro Sakai, Tokyo; Shin-ichi Kuramoto, Numazu; Shunichi Chiba, Kawasaki; Yasuo Asahina, Numazu; Junko Tomita, Tokyo, all of (JP)

(73) Assignee: Ricoh Company, Ltd., Tokyo (JP)

(21) Appl. No.: 09/132,660

(22) Filed: Aug. 12, 1998

(Under 37 CFR 1.47)

Related U.S. Patent Documents

Reissue of:
(64) Patent No.: 5,545,381
Issued: Aug. 13, 1996
Appl. No.: 07/828,710
Filed: Jan. 31, 1992

(30) Foreign Application Priority Data

| | | |
|---|---|---|
| Jan. 31, 1991 | (JP) | 3-032489 |
| Jan. 31, 1991 | (JP) | 3-032490 |
| Jan. 31, 1991 | (JP) | 3-032491 |
| Jan. 31, 1991 | (JP) | 3-032493 |
| Jan. 31, 1991 | (JP) | 3-032495 |
| Aug. 26, 1991 | (JP) | 3-213936 |

(51) Int. Cl.[7] ..... G01J 1/10
(52) U.S. Cl. ..... 422/186; 422/186.3; 422/24; 209/576; 209/546; 209/552; 209/581; 209/582; 355/202; 355/315; 271/298; 271/301
(58) Field of Search ..... 422/186, 186.3, 422/24; 209/576, 546, 552, 581, 582; 355/202, 315; 271/298, 301

(56) References Cited

U.S. PATENT DOCUMENTS 1,947,748 * 2/1934 Van Wormer .

(List continued on next page.)

FOREIGN PATENT DOCUMENTS 50-56942 * 5/1975 (JP) .
51-100728 * 9/1976 (JP) .

(List continued on next page.)

OTHER PUBLICATIONS

Defensive Publications, "Cleaning Method and Apparatus for Removing Developer from Photo–sensitive Elements", T896,01, Mar. 1972.*
Defensive Publication, "Method and Apparatus for Cleaning Photosensitive Elements" T892,011, Nov. 1971.*

*Primary Examiner*—Daniel J. Jenkins
(74) *Attorney, Agent, or Firm*—Oblon, Spivak, McClelland, Maier & Neustadt, P.C.

(57) ABSTRACT

The present invention discloses a device for regenerating a sheet-like recording medium comprising a means for feeding a printed sheet-like recording medium, a regenerating treatment means having a step for eliminating image formed on said recording medium, a means for discriminating and separating the recording medium whether the treated recording medium is reusable or not and a means for storing the separated reusable recording medium.

Further, the present invention discloses, as Examples, regenerating treatment means treating sheet-like recording media printed with following toners or inks with following degrading agent or a color eliminating agent;

(i) a toner comprising biodegradable plastics as a constituent ingredient and an enzyme containing liquid as a degrading agent;
(ii) a toner comprising photodegradable plastics as a constituent ingredient and an irradiation of a light containing a short wavelength light;
(iii) a toner or an ink using a coloring material comprising an electron-donating color-forming organic compound and its developer and a color-eliminating agent; and
(iv) a toner or an ink using a coloring material comprising an electron-accepting color-forming organic compound and its developer and a color-eliminating agent.

45 Claims, 12 Drawing Sheets

U.S. PATENT DOCUMENTS

| | | | | |
|---|---|---|---|---|
| 2,207,966 | * | 7/1940 | Billings, Jr. . | |
| 2,831,409 | * | 4/1958 | Bixby et al. . | |
| 2,937,390 | * | 5/1960 | Bolten et al. . | |
| 3,069,013 | * | 12/1962 | Neubrech et al. | 209/111.5 |
| 3,108,895 | * | 10/1963 | Howell . | |
| 3,230,305 | * | 1/1966 | Kendrick | 178/6 |
| 3,237,231 | * | 3/1966 | Zink . | |
| 3,328,821 | * | 7/1967 | LaMura . | |
| 3,598,487 | * | 8/1971 | Mizuguchi et al. . | |
| 3,613,701 | * | 10/1971 | Ando . | |
| 3,630,776 | * | 12/1971 | Barr | 134/9 |
| 3,656,948 | * | 4/1972 | Mammino . | |
| 3,776,381 | * | 12/1973 | Wood | 209/111.6 |
| 3,776,631 | * | 12/1973 | Mammino . | |
| 3,998,329 | * | 12/1976 | Araya et al. | 209/74 M |
| 4,252,882 | * | 2/1981 | Herrmann | 430/117 |
| 4,339,044 | * | 7/1982 | Grosvernier | 209/564 |
| 4,344,539 | * | 8/1982 | Lockett | 209/564 |
| 4,388,391 | * | 6/1983 | Schell | 430/39 |
| 4,392,742 | * | 7/1983 | Landa . | |
| 4,482,241 | * | 11/1984 | Moraw et al. . | |
| 4,499,834 | * | 2/1985 | Ruetshcle et al. | 112/2 |
| 4,504,995 | * | 3/1985 | Zippwald, Sr. . | |
| 4,733,422 | * | 3/1988 | Schramm et al. . | |
| 4,740,075 | * | 4/1988 | Schoernig . | |
| 4,799,596 | * | 1/1989 | Mallant | 209/580 |
| 4,800,839 | * | 1/1989 | Ariyama et al. . | |
| 4,905,047 | * | 2/1990 | Ariyama . | |
| 4,993,700 | * | 2/1991 | Winkler | 271/186 |
| 5,215,852 | * | 6/1993 | Kato et al. . | |
| 5,244,100 | * | 9/1993 | Regier et al. | 209/556 |
| 5,262,259 | * | 11/1993 | Chou et al. . | |
| 5,287,158 | * | 2/1994 | Nagashima et al. | 355/309 |
| 5,305,893 | * | 4/1994 | Hereford | 209/577 |
| 5,351,834 | * | 10/1994 | Duss | 209/576 |

FOREIGN PATENT DOCUMENTS

| | | | |
|---|---|---|---|
| 54-27435 | * | 3/1979 | (JP) . |
| 0099353 | * | 6/1979 | (JP) . |
| 55-154198 | * | 12/1980 | (JP) . |
| 55-30500 | * | 12/1980 | (JP) . |
| 57-114171 | * | 7/1982 | (JP) . |
| 57-125962 | * | 8/1982 | (JP) . |
| 57-125963 | * | 8/1982 | (JP) . |
| 57-190675 | * | 11/1982 | (JP) . |
| 58-105569 | * | 7/1983 | (JP) . |
| 59-2069 | * | 1/1984 | (JP) . |
| 59-33483 | * | 2/1984 | (JP) . |
| 59-89372 | * | 5/1984 | (JP) . |
| 59-93763 | * | 5/1984 | (JP) . |
| 59-93764 | * | 5/1984 | (JP) . |
| 59-98172 | * | 6/1984 | (JP) . |
| 60-133458 | * | 7/1985 | (JP) . |
| 60-182465 | * | 9/1985 | (JP) . |
| 60-193691 | * | 10/1985 | (JP) . |
| 60-230899 | * | 11/1985 | (JP) . |
| 61-213185 | * | 9/1986 | (JP) . |
| 61-237684 | * | 10/1986 | (JP) . |
| 62-14163 | * | 1/1987 | (JP) . |
| 62-102270 | * | 5/1987 | (JP) . |
| 62-203190 | * | 9/1987 | (JP) . |
| 62-212187 | * | 9/1987 | (JP) . |
| 62-199767 | * | 12/1987 | (JP) . |
| 63-39377 | * | 2/1988 | (JP) . |
| 63-73282 | * | 4/1988 | (JP) . |
| 63-140577 | * | 9/1988 | (JP) . |
| 1-101576 | * | 4/1989 | (JP) . |
| 1-101577 | * | 4/1989 | (JP) . |
| 1-137266 | * | 5/1989 | (JP) . |
| 1-145680 | * | 6/1989 | (JP) . |
| 1-297294 | * | 11/1989 | (JP) . |
| 2-11400 | * | 1/1990 | (JP) . |
| 2-3400 | * | 1/1990 | (JP) . |
| 2-3876 | * | 1/1990 | (JP) . |
| 2-19568 | * | 2/1990 | (JP) . |
| 2-55195 | * | 2/1990 | (JP) . |
| 2-59926 | * | 2/1990 | (JP) . |
| 2-62277 | * | 3/1990 | (JP) . |
| 2-111987 | * | 4/1990 | (JP) . |
| 2-188293 | * | 7/1990 | (JP) . |
| 2-188294 | * | 7/1990 | (JP) . |
| 2-117547 | * | 9/1990 | (JP) . |
| 2-227299 | * | 9/1990 | (JP) . |
| 2-249661 | * | 11/1991 | (JP) . |
| 4-22968 | * | 1/1992 | (JP) . |
| 4-57070 | * | 2/1992 | (JP) . |
| 4-64472 | * | 2/1992 | (JP) . |
| 4-64473 | * | 2/1992 | (JP) . |
| 4-67043 | * | 3/1992 | (JP) . |
| 4-82983 | * | 3/1992 | (JP) . |
| 4-89271 | * | 3/1992 | (JP) . |
| 4-91298 | * | 3/1992 | (JP) . |
| 4-234056 | * | 8/1992 | (JP) . |
| 4-118499 | * | 10/1992 | (JP) . |
| 4-118500 | * | 10/1992 | (JP) . |
| 4-281096 | * | 10/1992 | (JP) . |
| 4-300395 | * | 10/1992 | (JP) . |
| 4-327299 | * | 11/1992 | (JP) . |
| 4-333088 | * | 11/1992 | (JP) . |
| 4-333699 | * | 11/1992 | (JP) . |
| 4-356085 | * | 12/1992 | (JP) . |
| 4-356086 | * | 12/1992 | (JP) . |
| 4-356087 | * | 12/1992 | (JP) . |
| 4-356088 | * | 12/1992 | (JP) . |
| 4-356089 | * | 12/1992 | (JP) . |
| 5-2356 | * | 1/1993 | (JP) . |
| 5-61382 | * | 3/1993 | (JP) . |
| 5-127571 | * | 5/1993 | (JP) . |
| 5-216374 | * | 8/1993 | (JP) . |
| 5-216376 | * | 8/1993 | (JP) . |
| 6-43682 | * | 2/1994 | (JP) . |
| 6-67676 | * | 3/1994 | (JP) . |
| 6-206-358 | * | 7/1994 | (JP) . |
| 6-208318 | * | 7/1994 | (JP) . |
| 8903728 | * | 5/1989 | (WO) . |

* cited by examiner

DEVICE FOR REGENERATING PRINTED SHEET-LIKE RECORDING MEDIUM

Matter enclosed in heavy brackets [ ] appears in the original patent but forms no part of this reissue specification; matter printed in italics indicates the additions made by reissue.

BACKGROUND OF THE INVENTION

The present invention concerns a device for regenerating a printed sheet-like recording medium for erasing images on a printed sheet-like recording medium and enabling the thus treated medium to be reused as it is by a printing device.

Recently, amount of recording paper used in individual firm or organization has been greatly increased along with the startling progress in copying machines and word processors which has, correspondingly, increased the amount of printed paper to be discarded, and regeneration and reuse thereof has become a significant problem in view of environmental protection.

For regenerating such paper, although it has been adapted to beat the printed paper into pulpous form, which is then formed by a paper-making process into paper for reuse in a very small amount, it requires to previously discriminate as to whether or not the printed paper can be deinked after pulping. However, while the discrimination generally needs an expert's judgment, it is difficult to leave the judgment of the deinking property to outside experts in view of keeping the contents of the recording paper to be discarded in secret. From a view point of keeping secret, discarded documents are finely shredded by cutters such as shredders before disposal in most of firms or organizations. However, it is actually impossible to separate such shredded recording papers to be discarded into those which can and can not be deinked and, in addition, to remove clips or plastic materials included therein, and they are after all put to incinerating treatment at present. This invites reckless deforestation and also leads to air pollution.

Further, even when it is attempted to prepare regenerated paper by deinking the thus shredded recording papers and putting them to a paper-making step, since the resultant regenerated paper has a dark tone and the cost for the regeneration is more expensive than that for the production of new papers, it is not favored both by consumers and manufactures and only little amount of the printed paper is utilized for the regeneration at present.

The present inventors have made an earnest study for completing a regeneration device for a printed sheet-like recording medium capable of dissolving the foregoing problems, aiming at regeneration device capable of treating the medium at least in each of firms or organizations, if possible, in a restricted quarter, i.e., a regeneration device that can be used with ease and convenient like that existing copying machines with a view point of keeping secret and, as a result, have accomplished the regeneration device of the present invention in an approach of erasing images on the printed sheet-like recording medium and restoring it into the original state.

SUMMARY OF THE INVENTION

An object of the present invention is to provide a device for regenerating printed sheet-like recording medium.

Another object of the present invention is to provide a device for regenerating a printed sheet-like recording medium that can be used with ease requiring no skilled knowledge of experts.

A further object of the present invention is to provide a device for regenerating a printed sheet-like recording medium capable of treating the printed recording medium, which is otherwise a waste, without leaking its secret contents to the outside, in a restricted inside or quarter and capable of using it as a new recording medium.

A further object of the present invention is to provide a device for regenerating a printed sheet-like recording medium comprising means for supplying a sheet-like recording medium, means for applying regenerating treatment, means for separation and means for storage.

A further object of the present invention is to provide a device for regenerating a printed recording medium comprising means for applying regenerating treatment by treating the printed surface of the sheet-like recording medium printed with a degradable toner by means of a degrading agent containing an enzyme or an enzymatically effecting material, or under the irradiation of a short wavelength light thereby erasing images thereon.

A still further object of the present invention is to provide a device for regenerating a printed recording medium comprising a regeneration treating means for treating the printed surface printed with a toner or ink comprising an electron donating or electron accepting color-forming organic compound and a color developer as a coloring material with a color-eliminating agent, thereby erasing images thereon.

BRIEF EXPLANATION OF THE DRAWINGS

FIG. 6b shows scanning lines on the printed surface of the sheet-like medium in which the density detection element is made movable to right and left as is shown in FIG. 6a.

Meanings for the references (including numericals) used in each of the figures are shown below.

Figure 11:
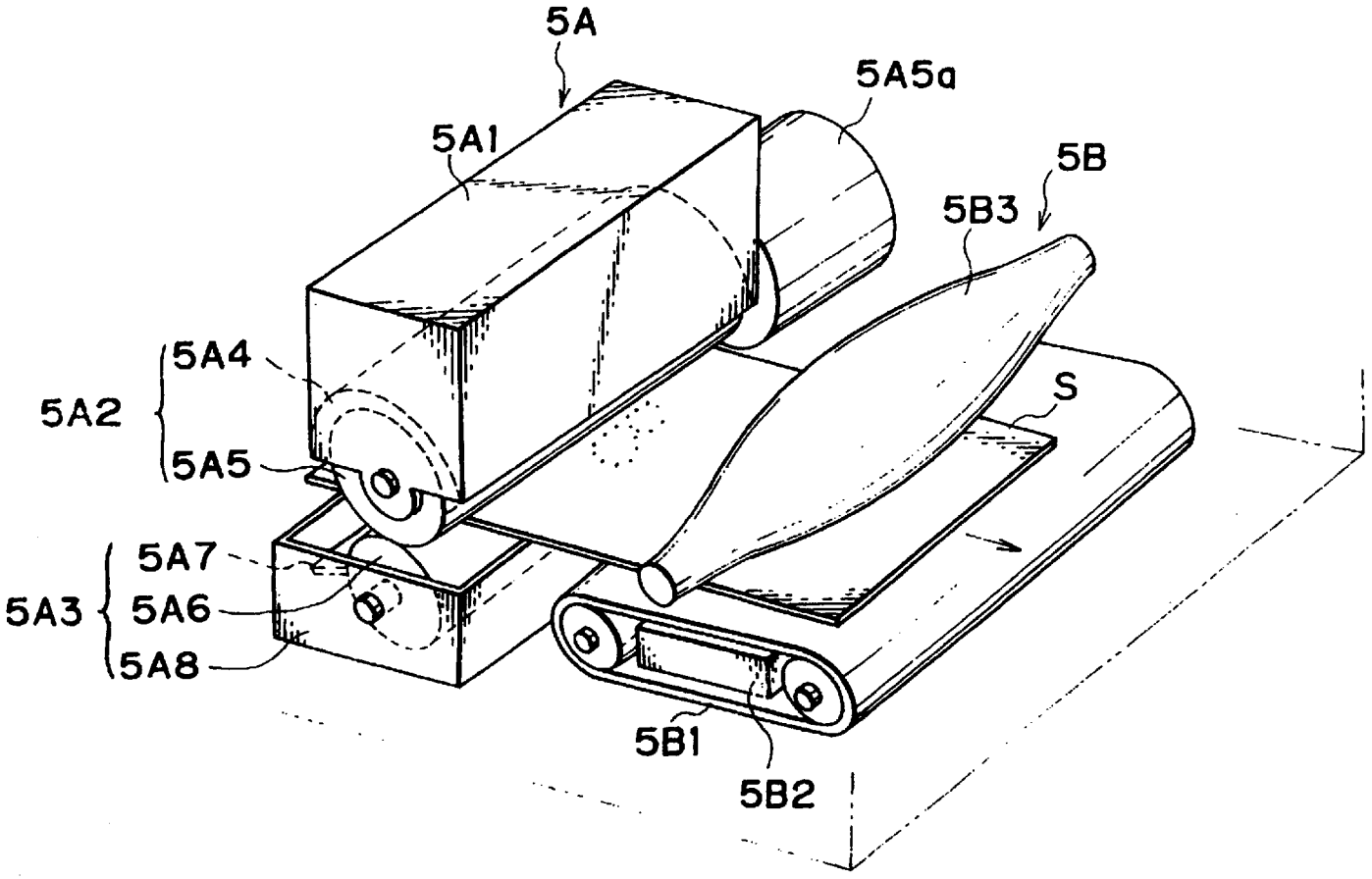
FIG. 11 shows a print degrading treatment section and a drying section constituting the regenerating treatment means in the regeneration device for the recording medium printed by using a toner or ink comprising an electron donating or electron accepting color-forming organic compound and a developer as a coloring material.

S: Printed sheet-like recording medium
1: 1A: Housing for the entire regeneration device
2: Means for feeding sheet-like recording medium
2A: Printed sheet-like recording medium containing tray
2B: Delivery roller
3: Regenerating treatment means
3A: Print degrading treatment section
3A1 Introduction port
3A2 Discharge port
3A3 Degrading agent storage tank
3A4 Degrading agent coating member
3A5 Conveyor belt
3A6 Driving pulley
3A7 Driven pulley
3A8 Temperature/humidity sensor
3A9 Ultrasonic humidifier
3A10 Ceramic heater
3A11 Light irradiation member
3B: Drying section
3B1 Conveyor belt
3B2 Heater
3B3 Blower
3B4 Duct
3C: Cleaning section
3C1 Toner removing member
3C2 Ultrasonic vibrator
3C3 Cleaning member
3C4 Toner recovering member
4: Separation means
4A: Density detecting element
4B: Separating section
4B1 Conveyor belt (effective length: L)
4B2 Conveyor path switching pawl
4B3 Change-over switch
4B3a Driving circuit
9: Storage means
9A: Reusable recording medium discharging channel
9A1 Reusable recording medium tray
9B: Not-reusable recording medium discharging channel
9B1 Not-reusable recording medium tray
5: FIG. 11
5A: Print degrading treatment section
5A1 Color eliminating agent tank
5A2 Color eliminating agent coating device
5A4 Coating felt
5A5 Coating roller
5A5a Roller driving motor
5A3 Color-eliminating agent recovery apparatus
5A6 Driven roller
5A7 Scraper
5A8 Agent recovery tank
5B: Drying section
5B1 Conveyor belt
5B2 Lower heater
5B3 Upper heater
1: Regeneration device (FIG. 4)
1B: Sheet-like recording medium feeding means
1B1 Storage cassette
1B2 Delivery roller
1B3 Feed roller
1C: Regenerating treatment means
1D: Storage means for regenerated sheet-like recording medium
1D1 Reusable medium stacker
1D2 Not reusable medium disposal tank
1D3 Shredder
1E: Separating means
1E1 Treated paper conveying path
1E1a Switching pawl for not reusable medium conveying path
1E1b 1E1a driving solenoid
1E1c 1E1b driving circuit (FIG. 5)
1E2 Reusable recording medium conveying path
1E2a Conveying passage switching pawl for medium to be recycled to 1C
1E2b 1E2a driving change-over switch
1E2c 1E2b driving circuit (FIG. 5)
1E3 Not reusable medium conveying path
1E4 Recycling conveying path to 1C
3 & 4: Printing density detecting elements
6: Detecting section (FIG. 12)
6A: Charge-coupled device
6B: Density detecting element
6C: Pinch roller
7: Print degrading treatment section (FIG. 12)
7A: Spray head
7A1 Rod
7A2 Pulley
7A3 Endless belt
7A4 Nozzle moving motor
7A4a 7A4 driving circuit (FIG. 13)
7A5 Color-eliminating agent tank [incorporating pump 7A5' (not shown)]
7A5'a 7A5' driving circuit (FIG. 13)
7B: Recording medium and detecting element
7C: Pinch roller
7D: Guide plate
7E: Conveyor belt
8: Control section (FIGS. 2, 5 and 13)
8A: Microcomputer
8B: Input/output (I/O) interface
8C: RAM
8D: ROM

DETAILED EXPLANATION OF THE INVENTION

The sheet-like recording medium referred in the present invention involves all sheet-like media capable of recording by printing, for example, paper, plastic sheet, cloth and sheet-like non woven fabric. The term "recording paper" or "paper" to be described hereinafter in the present specification means such sheet-like recording media as described above unless otherwise specified.

The present invention is a device comprising a means for feeding recording paper after printed with a printing apparatus, a regenerating treatment means having a step of erasing images formed on the printed paper, a means for detecting, discriminating whether the regenerated recording paper can be reused or not, and separating the recording paper according to the detection and a means to stock the separated reusable recording paper.

Further, in accordance with the present invention, the regenerating treatment means comprises a print degrading treatment section, a driving section and a cleaning section.

Further, in the regeneration device of the present invention comprising a means for feeding printed recording paper, a regenerating treatment means having a step of erasing images formed on the printed paper, a means for detecting, discriminating whether or not the regenerated recording paper is reusable and, separating the paper according to the discrimination and a means to store the separated reusable recording paper, it is preferable that at least the print degrading treatment section, for erasing print, in the regenerating means can be tightly closed.

Further, in the regenerating treatment means of the present invention comprising at least a print degrading treatment section and a driving section for driving the print degraded recording paper, it is preferable that the drying section can be tightly closed.

EXAMPLE

Description will be made in details with the examples of the present invention referring to FIG. 1 to FIG. 13.

Figure 1:
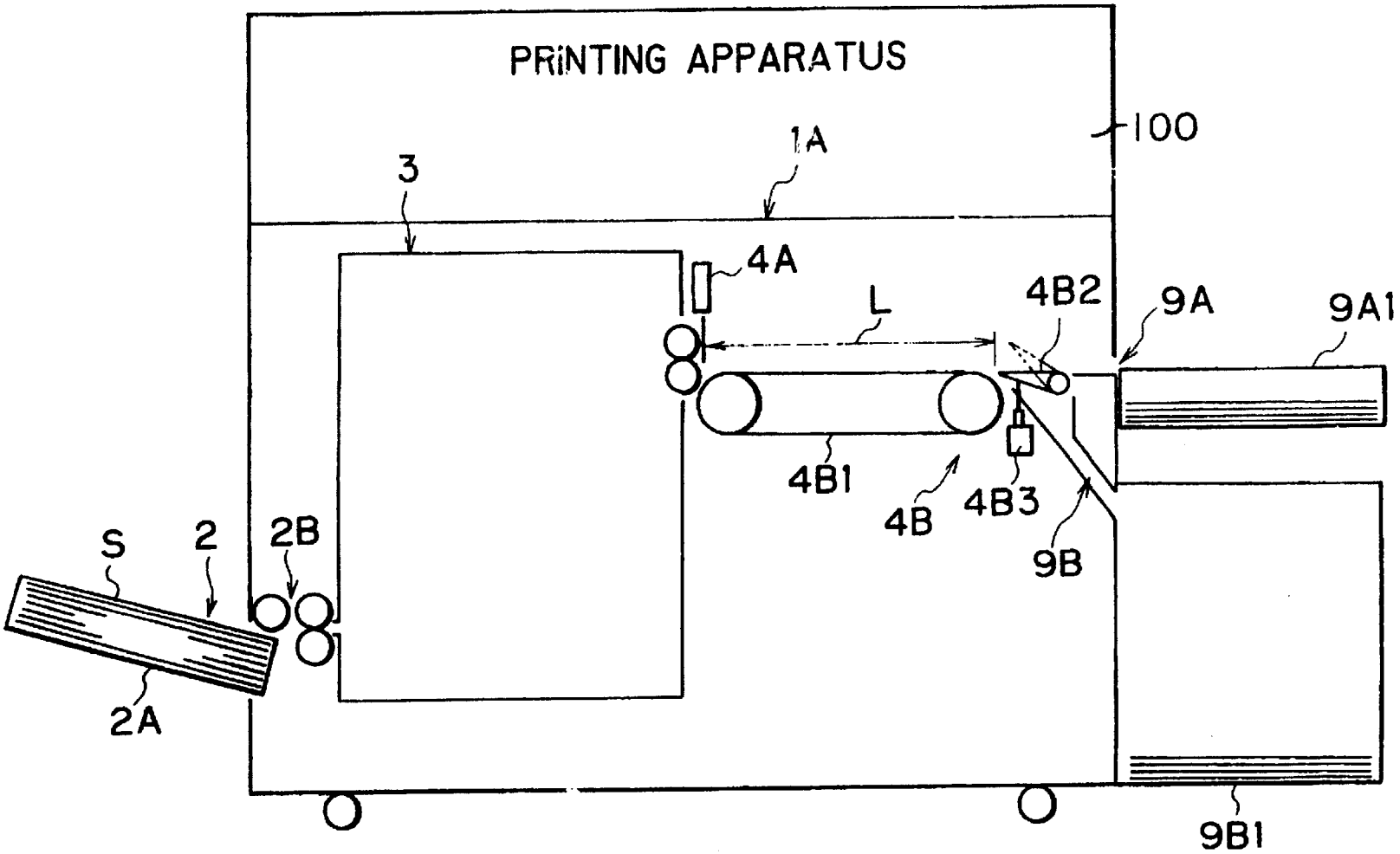
FIG. 1 is a schematic view illustrating the arrangement of an entire constitution of a regeneration device according to the present invention.

As seen in FIG. 1, the regeneration device according to the present invention comprises a paper feed means 2 using an optional known method, a regenerating treatment means 3 the content of which is to be described later, a separating means 4 for (which can include, for example, the elements shown at 4A and 4B) detecting the printed density on the surface of regenerated paper, discriminating whether the paper is reusable or not and separating the same in accordance with the discrimination and a storage means 9 (which can include one or more bins as shown at 9A, 9A1, 9B1, etc.) for storing the separated paper into each of stuckers.

Further, it is preferable to connect the regeneration device to a printing apparatus, for example, by placing a printing apparatus, such as a copying machine, (e.g., as shown at 100 in FIG. 1) on the upper surface of the housing 1A.

The paper feed means 2 comprises a containing tray 2A and a delivery roller 2B for the printed recording paper to be regenerated.

Figure 2:
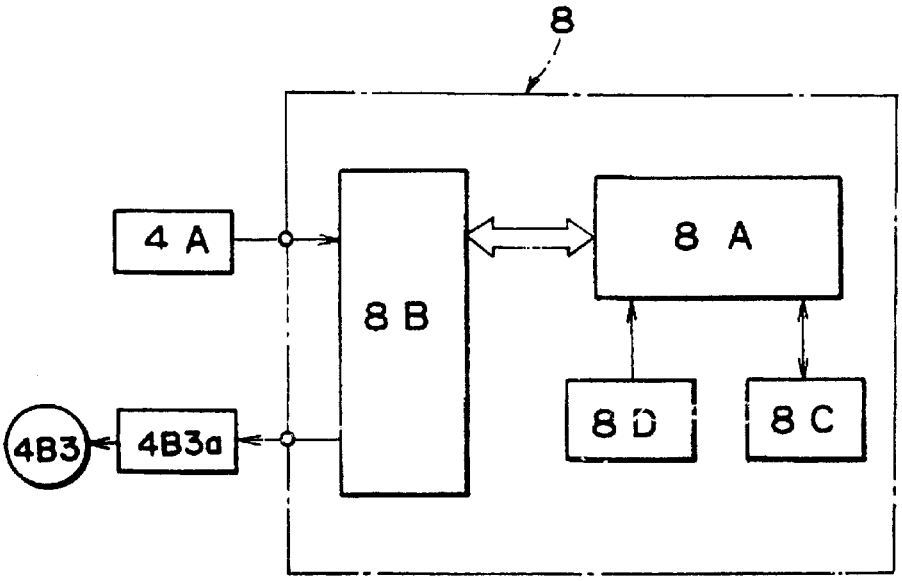
FIG. 2 is a schematic view for the arrangement of a control section in the regeneration device according to the present invention not shown in FIG. 1.

In the separation means 4, a printed density on the paper after the regenerating treatment by a printed density detecting element 4A, such as a photosensor, a detected output thereof is input via an input/output interface 8B of a control section 8 in FIG. 2 to a microcomputer 8A.

Figure 3:
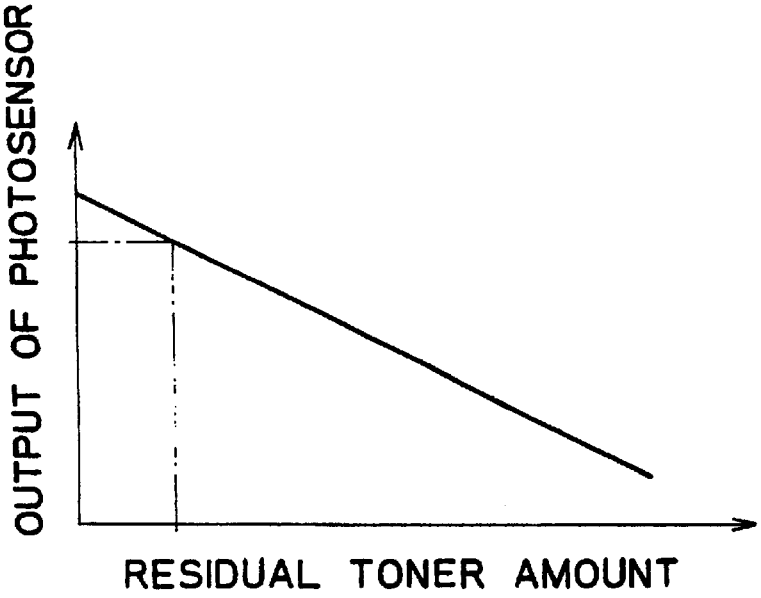
FIG. 3 is a graph illustrating a relationship between the detection output of a density detection element and the amount of a residual toner used for the control section shown in FIG. 2.

In 8A, it is judged whether the regenerated recording paper is reusable or not utilizing a relationship between a residual amount of a toner and the output of a photosensor shown in FIG. 3, drive a conveying path switching pawl 4B2 by turning a changeover switch 4B3 (for example, a solenoid type switch), via the interface 8B and a driving circuit 4B 3a, based on the judgement to convey the treated paper to each of the compartments by a conveyor belt 4B1, convey the reusable paper through a conveyor path 9A into 9A1 and, if necessary, supply the same as it is to a printing apparatus.

Alternatively, it is also possible to supply the reusable recording paper directly to a printing apparatus without storing in 9A1. The paper judged to be not reusable is conveyed through 9B into 9B1 and then discarded properly.

Assuming a recording paper conveying distance from the detecting element 4A placed upstream of the conveyor belt 4B1 to the pawl 4B2 placed downstream as "L" and a detection width of the element 4A as "B", it is preferable that the maximum length $L_o$ and the maximum width $B_o$ of the recording paper that can be treated in the present device has a relation: $L>L_o$ and $B>B_o$ Further, the separation means 4 and thereafter will be explained more specifically.

The separation means 4 is a section for discriminating to classify whether the recording paper S come through the degrading treatment section in the regenerating treatment means 3 is reusable or not and it comprises the printing density detecting element 4A, for example, a photosensor, and the separating device 4B as shown in FIG. 1.

And said discrimination is carried out whether a detected output of the element 4A for the recording paper S treated in 3 is higher than the standard voltage determined according to the individual situation. For example, it is possible to determine the standard as a voltage value calculated by the equation:

(output of the photosensor corresponding to a reflecting light of a surface of the recording paper having no image thereon)×(predetermined ratio).

Further, FIG. 3 shows a graph taking a residual amount of toner on the paper S on the axis of abscissa and an output of a photosenser to a reflecting right on the axis of ordinal and the graph indicate that when the residual amount is much, the output is small.

The detecting element 4A described above is situated near the recording paper discharging section in the regenerating treatment means 3 for detecting the density of the image on a surface of the recording paper S, which is connected to the control section 8 to be described later. Further, the element 4A is disposed so that the detection width (B) can be made greater than the maximum width $B_o$ of the recording paper S to be regenerated and it is sometimes preferable to place a plurality of the element in parallel along the lateral direction or to make the element reciprocated in the lateral direction.

Then, the separating apparatus 4B described above comprises a conveyor belt 4B1 for conveying the recording paper S after passing the element 4A, a conveying path switching pawl 4B2 which can swing situated at the end of 4B1 and a change-over switch 4B3 for swinging the pawl 4B2. The pawl 4B2 is disposed at a position where a first discharging channel 9A for supplying the reusable recording paper and a second discharging channel 9B for supplying the not reusable recording paper are branched from each other and the pawl is usually set to a state capable of transferring the recording paper S toward the first discharging channel 9A.

The trays 9A1 and 9B1 are disposed to the ends of the first and the second discharging channels 9A and 9B.

On the other hand, as shown in FIG. 2, the control section 8 described above comprises the microcomputer 8A as a main part and it is connected by way of the I/O interface 8B to external equipments.

The element 4A is connected to the input of the interface 8B, while the change-over switch 4B3 provided to the separating device 4B is connected by way of the driving circuit 4B3a to the output of the I/O interface 8B respectively.

It is adapted in the control section 8 so that the amount of the residual toner on the recording paper S is detected based on a relationship between the amount of light from the recording paper S and the output from the element 4A obtained by the amount of light as shown in FIG. 3, and the state of elimination of the toner on the recording paper S is judged.

Further, it is also adapted so that the end of the detection of the recording paper S by 4A is detected also by the abrupt change of the detection output, specifically, the time at which an output corresponding to the amount of light from the non-image area of S or to a calculated output which is set while considering contamination of the area is obtained. The detection is used for setting the time for closing and opening the inside of the print degrading treatment means 3.

Namely, the concentration detected output by the photosensor 4A is put into the microcomputer 8A in the control section 8 in FIG. 2 and the output is judged by 8A whether it is more than a predetermined value. When 8a judged that the output is more than the predetermined value and the printed image on the paper S is sufficiently degraded, 8a maintains the driving circuit 4B4 in a normal state and set solenoid 4B3 and pawl 4B2 in the separating section 4 in a normal position and a recording paper S which is judged reusable goes into the tray 9A1 through the first discharging channel 9A.

On the other hand, when the output of 4A is less than the predetermined value, an electric output works on solenoid 4B3, through driving circuit 4B4 and a position is set to send a recording paper S to the second discharging channel 9B. The fact that the detected output is less than the predetermined value means that the print degrading treatment is not enough or the paper is printed by a toner using a component which is undegradable by the device. Therefore, in this case, the paper S is sent to the tray 9B1 which is disposed at the end of the second discharging channel 9B by swinging the pawl 4B2.

Further, a waste bank, such as shredder, can be placed instead of 9B1 at the end of 9B. If the shredder is designed to work only when the pawl 4B2 is in a position shown by a dotted line, a disposal of a secret document can be done without being seen by others.

Further, instead of the tray 9A1, if the end of the first discharging channel is connected to the paper feeding section of a printing apparatus, it is preferable when it is necessary to feed the reusable regenerated recording paper to a printing apparatus.

Figure 4:
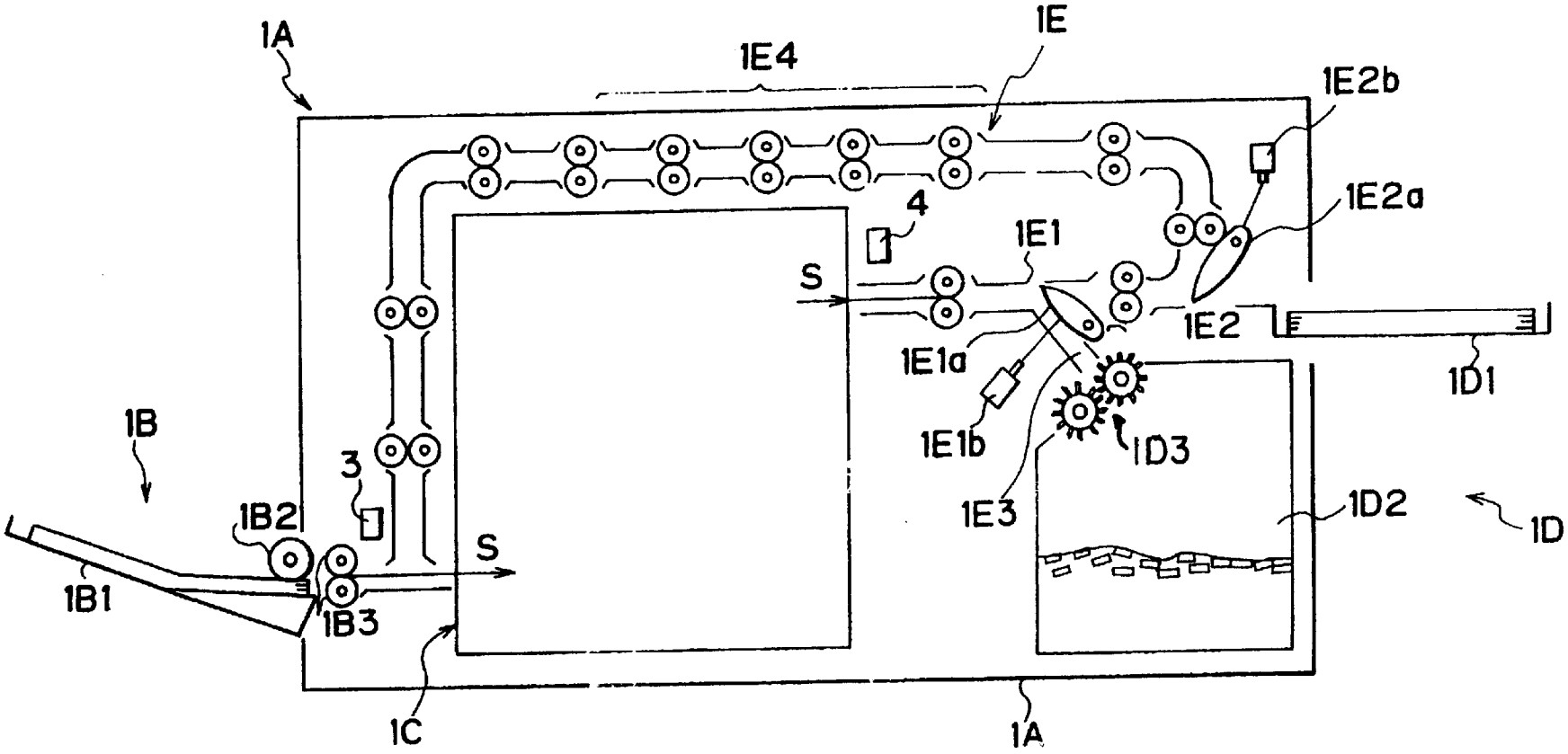
FIG. 4 is a schematic view for the arrangement of an improved regeneration device according to the present invention which compares the printed density on a printed sheet-like recording medium before regenerating treatment and a printed density after the regenerating treatment and separating the treated medium into those that are reusable, those that are not reusable and those to be recycled to the regenerating treatment means.
Figure 5:
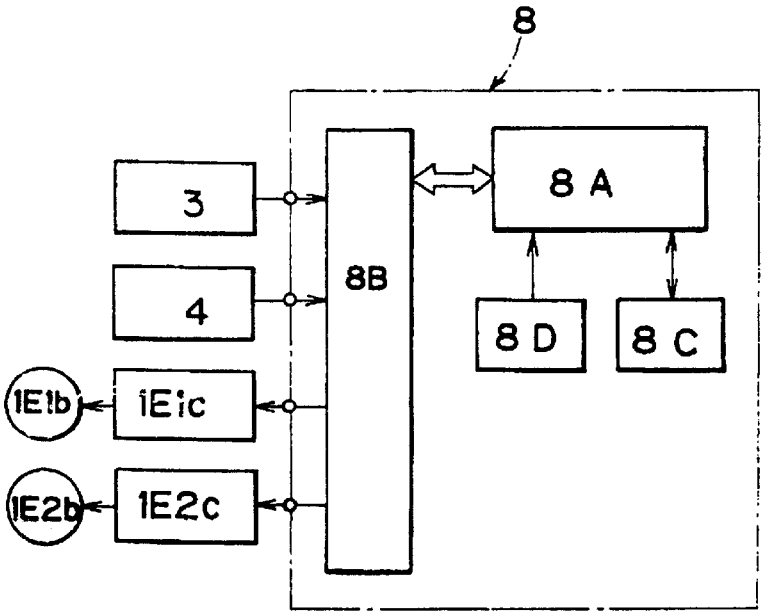
FIG. 5 is a schematic view for the arrangement of a control section coping with an increase of one separating and conveying circuit for the treated medium in FIG. 4.

Further, FIG. 4 shows a modified type to that shown in FIG. 1, that is, a regeneration device comprising a paper feed means 1B, a regenerating treatment means 1C, the content of which is to be described later, a separating means 1E for separating the treated paper into reusable paper, not-reusable paper and the paper to be put to regenerating treatment again and a storage means 1D to stored the treated paper.

The recording paper regeneration device shown in FIG. 4 comprises a housing 1A and a paper feeding section 1B disposed on one of the walls thereof for keeping recording paper S after copying with a printing apparatus, such as a copying machine, and becoming a waste.

The paper feeding means 1B comprises a recording paper storage cassette 1B1, a delivery roller 1B2 which can be selectively in contact with or apart from the top end of the recording paper S in the cassette 1B1 and a feed roller 1B3, so that the recording paper S in the cassette 1B1 is delivered and supplied toward the regenerating treatment means 1C to be described later.

The regenerated paper storage means 1D has a reusable recording paper stacker 1D1 for storing reusable recording paper and a disposal tank 1D2 for storing not reusable recording paper among the recording paper S discharged from the regenerating treatment means 1C, and a shredder 1D3 is disposed at an inlet of the disposal tank 1D2 for shredding the introduced not-reusable recording paper.

Accordingly, the conveying path 1E1 for a paper discharging side of the regenerating treatment means 1C is branched into a conveying path 1E1 leading to the reusable recording paper stacker 1D1 and conveying path 1E2 leading to the disposal tank 1D2, and a swingable first conveying path switching pawl 1E1a is disposed at the junction. The swinging state of the first conveying path switching pawl 1E1a is set by a solenoid 1E1b under driving control by a control section 8 to be described later and it is set, as a normal state, i.e., as an initial state, so as to introduce the recording paper for example into 1D2.

Further, the conveying path 1E1 is further branched behind the conveying path switching pawl 1E1a and one is extended to the reusable recording paper stacker 1D1 and the other is extended to the paper feeding means 1B described before.

The reusable recording paper stacker 1D1 is not necessarily be limited to one. It is sometimes preferable to have a plural number of the stacker 1D1 and storage reusable recording papers, for example, separating them size by size.

Therefore, a second conveying path switching pawl 1E2a is also disposed at the junction of the conveying path situated behind the first conveyor path switching pawl 1E1a, and the swinging state of the pawl 1E2a is set by a solenoid 1E2b under driving control by a control section 8 to be described later and it is set, as a normal state, i.e. an initial state, so as to introduce the recording paper S, for example, to the paper feeding means 1B. In FIG. 4, the reference 1E4 denotes feed rollers disposed in the conveying path as well as the path to 1B.

On the other hand, as shown in FIG. 5, the control section 8 comprises a microcomputer 8A as a main part and it is connected by way of an I/O interface 8B to external equipments.

That is, the I/O interface 8B is connected, at its input, with the density detecting elements, for example, reflection type photosensors, 3 and 4 for the detection of printing density disposed at a position introducing the recording paper from the paper feeding means 1B to the regenerating treating means 1C, and on the discharging side of the recording paper from 1C in the separating means 1E respectively and, at its output, with a driving circuit 1E1c for the solenoid 1E1b for the first conveying path switching pawl 1E1a and a driving circuit 1E2c for the solenoid 1E2b for the second conveying path switching pawl 1E2a.

Figure 6A:
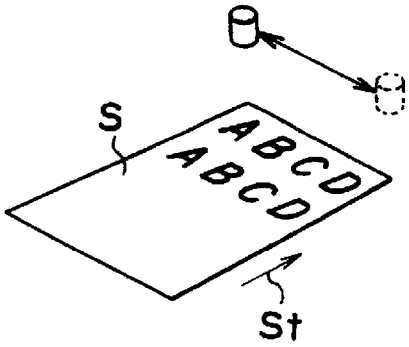
Figure 6B:
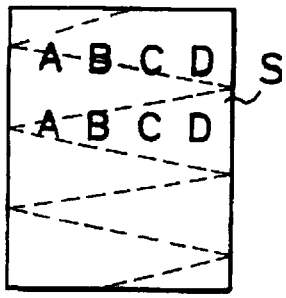

As shown in FIG. 6a, the photosensors 3 and 4 are designed to move in perpendicular to the conveying direction (St) of the recording paper S so that they can scan a considerable range of area along the lateral direction and the longitudinal direction of the recording paper S as shown by the broken line in FIG. 6b. The relation between the output from the photosensors 3 and 4 and the density, that is, the amount of the residual toner is as shown in FIG. 3, in which it is indicated that the sensor output due to the amount of reflection light is reduced as the residual amount of the toners increased.

Then, in the control section 8 described above, the print density ($D_1$) before the regeneration and the print density ($D_2$) after the regeneration on the printed surface of the recording paper S detected by each of the photosensors 3 and 4 are inputted. Then, if the following relation is satisfied:

$$D_1-D_2 \leqq 0 \quad (1)$$

the first conveying path switching pawl 1E1a is kept at the initial state by not driving the driving circuit 1E1c for the solenoid 1E1b. Accordingly, the recording paper S discharged from the regenerating treatment means 1C is fed through the conveying path 1E1 by way of 1E3 to the disposal tank 1D2.

On the other hand, if each of the above-mentioned densities satisfies the following relation:

$$D_1-D_2>0 \quad (2)$$

the first conveying switching pawl 1E1a is swung from the initial state by driving the driving circuit 1E1c for the solenoid 1E1b. Accordingly, the recording paper S discharged from the regenerating treatment means 1C is conveyed passing through the conveying path 1E1 to a position for the second conveying path switching pawl 1E2a.

When the first conveying path switching pawl 1E1a is set to the swung state and, if the density ($D_2$) on the regenerated surface of the recording paper after the regeneration is in the following relationship relative to the standard density ($D_0$) which is a standard to judge the paper is usable or not [for example background density (having no image) of the recording paper]:

$$D_0-D_2 \geqq 0 \quad (3)$$

it is judged that the density of the recording paper after the regeneration is a density capable of reusing and the second conveying path switching pawl 1E2a is swung from the initial state by driving the driving circuit 1E2c for the solenoid 1E2b. Accordingly, the recording paper S is fed to the reusable recording paper stacker 1D1.

On the other hand, when the relation (3) above is not satisfied, it is judged that erasion of a printed portion of the paper is not enough by one treatment although the regeneration has been done to some extent, and the second conveying path switching pawl 1E2a is maintained at the initial state by not driving the driving circuit 1E2c for the solenoid 1E2b. Accordingly, the recording paper S is fed to the paper feeding means 1B and then undergoes the regeneration again.

The background density used as the standard density as described above is preferably determined actually as follow:

$$D_o=D_{MIN}+D_o'$$

relative to the background density ($D_{MIN}$) of the recording paper not yet printed while taking the density ($D_o'$) caused by the contamination due to remaining toner in the fibers of the recording paper S into consideration.

Figure 7A:
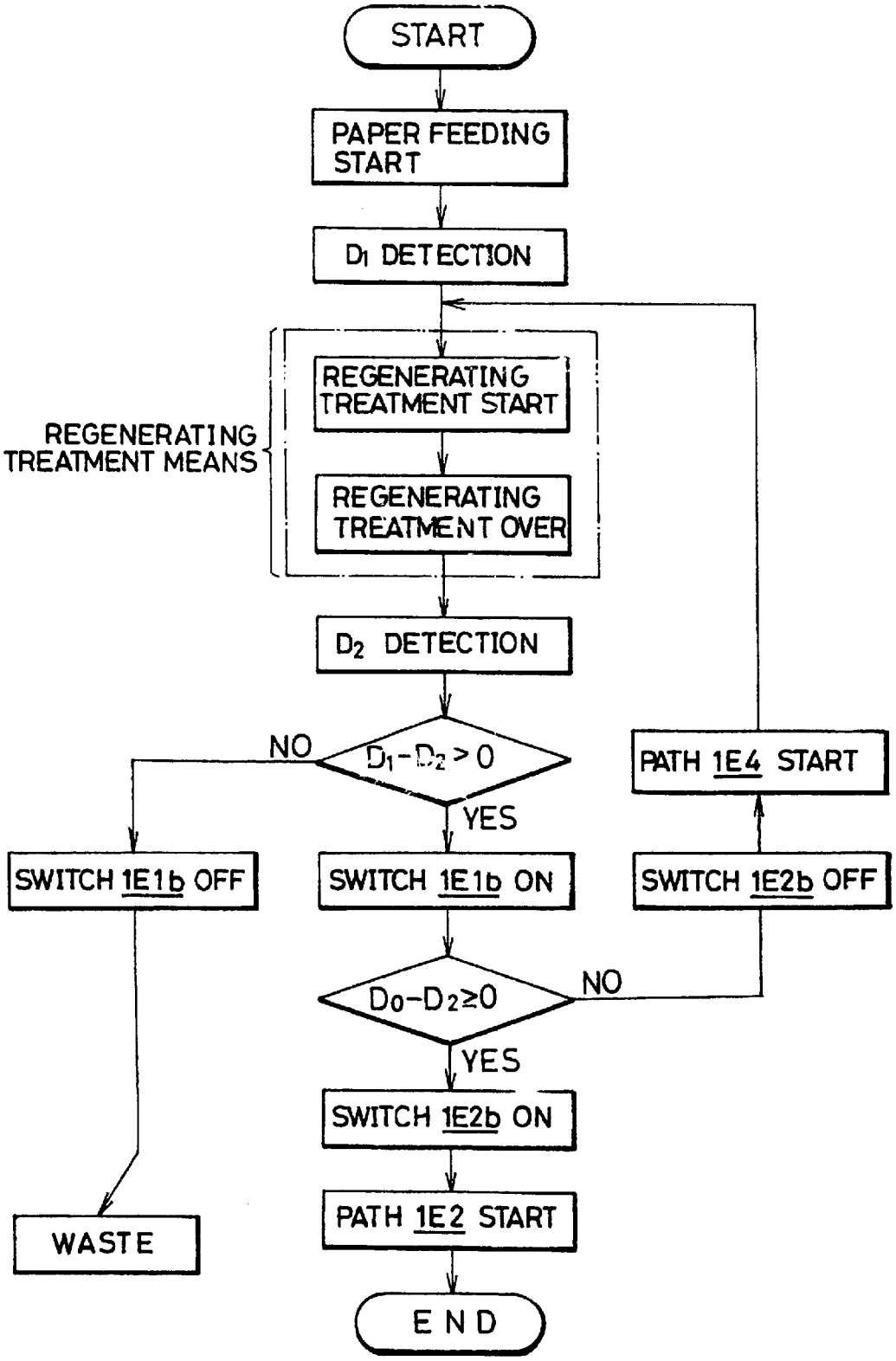
FIG. 7a is a flow diagram illustrating the conveying path for the sheet-like medium in the regeneration device shown in FIG. 4 and the switching operation therein.

This embodiment has been constituted as described above, and description will be made to the state of conveying the recording paper based on the operation of the control section 8 shown in the flow chart FIG. 7a.

When the recording paper S is fed from the paper feeding means 1B to the regenerating treatment means 1C, the density on the printed surface of the recording paper S is detected before it is introduced into the regenerating treatment means 1C by the photo sensor 3, and the detection data is put into the memory portion of the control section 8.

Then, the density of the recording paper S discharged after the regeneration is detected by the photosensor 4, and the detection data is put into the memory portion described above, for which the relation shown by the equations (1)–(3) is judged. Then, according to the judgment, the feeding paths to the reusable recording paper stacker 1D1, the discarding tank 1D2 and the paper feeding means 1B are set by setting the state of the first conveying path switching pawl 1E1a and the second conveying path switching pawl 1E2a.

In the constitution described above, the photosensors for detecting the density of the recording paper are disposed on the side of introducing and discharging the recording paper to and from the regenerating treatment section.

However, in FIG. 4, by disposing the paper feeding means 1B and the separating means 1E on the same side of the regenerating treatment means 1C, it is possible to reduce two density detecting elements to one and to make the conveying path 1E4 shorter and these arrangements are sometimes preferable.

Figure 8:
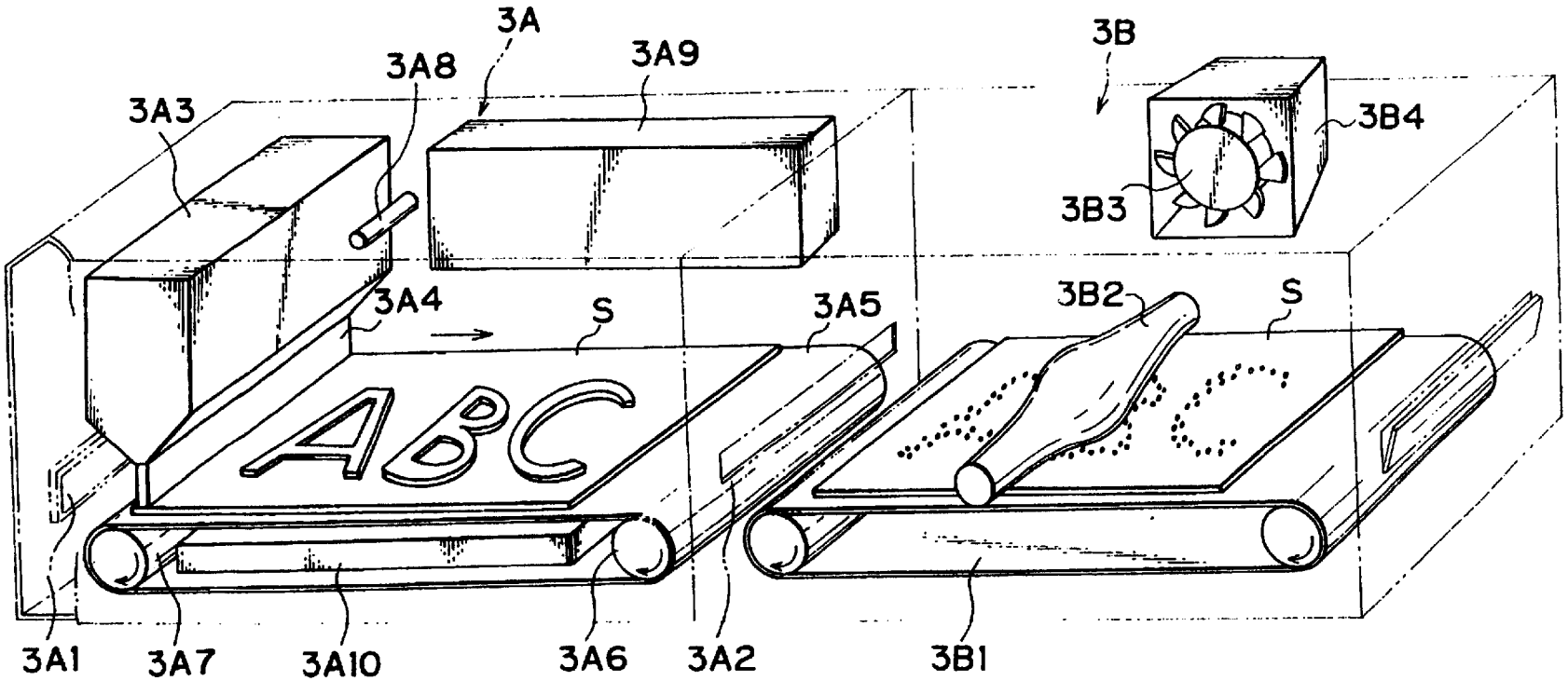
FIG. 8 shows a print degrading treatment section constituting the regenerating treatment means in the regeneration device for a recording medium printed by a biodegradable toner and a drying section and FIG. 9 shows a cleaning section also constituting the means described above.

FIG. 8 and succeeding figures show detailed description of the regenerating treatment means (3 in FIG. 3 and 1C in FIG. 4).

Figure 9:
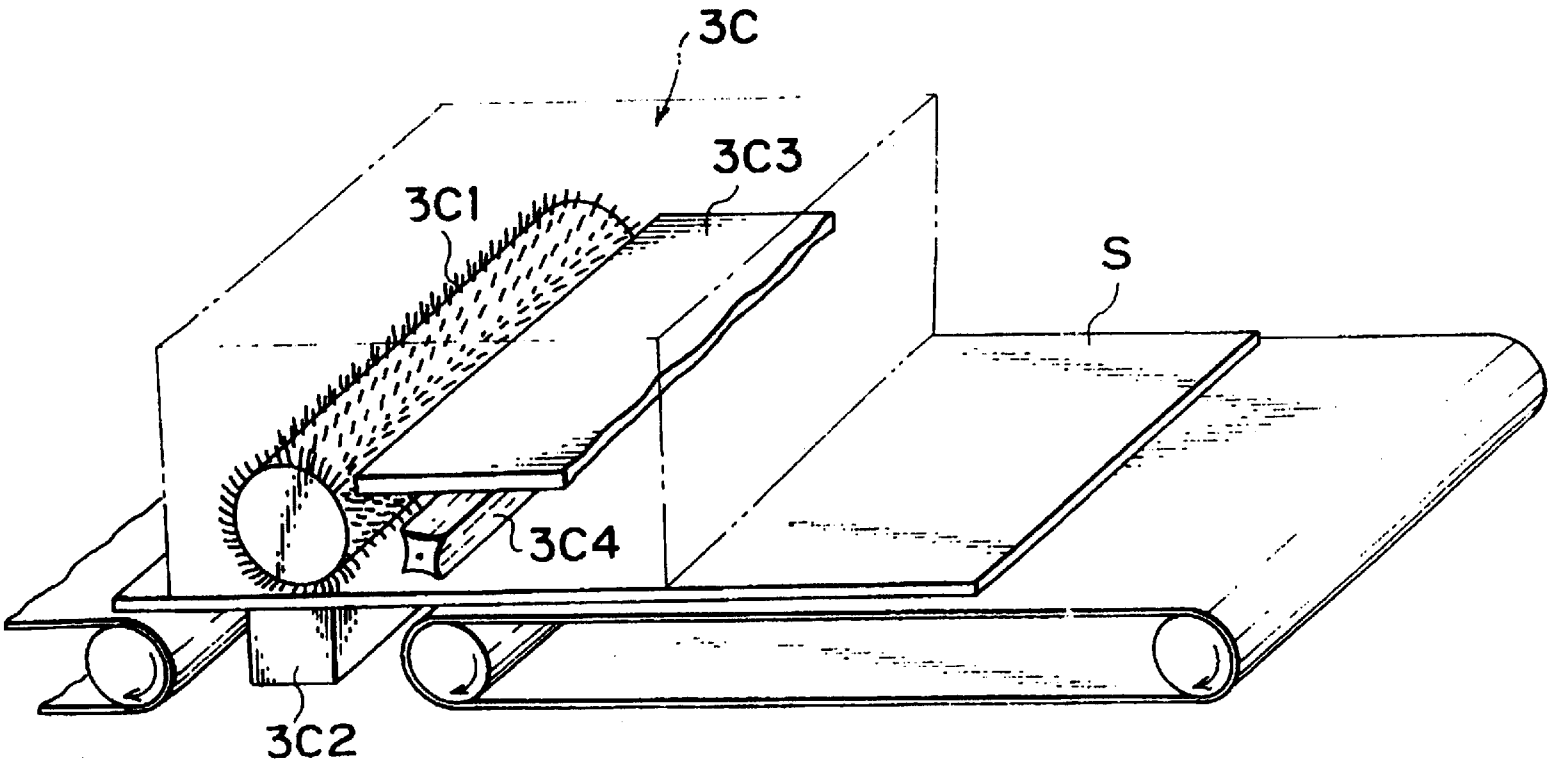

FIG. 8 and FIG. 9 show means for regenerating recording paper printed by using a toner comprising a biodegradable plastic as a constituent ingredient, and FIG. 8 shows a print degrading section 3A and a drying section 3B, while FIG. 9 shows a cleaning section 3C.

The print degrading section 3A is a section for destroying the property of the toner composed of a biodegradable plastic and eliminating functions required for the toner including so-called fixing and depositing property or the like and it comprises, as shown in FIG. 8, a tightly closed space formed with openings 3A1 and 3A2 at the introducing and discharging ports for the recording paper S and comprises a degrading agent storage tank 3A3 for storing a degrading agent containing microorganisms or enzymes for degrading the toner, a degrading agent coating device 3A4 and a conveyor belt 3A5.

The degrading agent coating device 3A4 comprises a felt material extended between the degrading agent storing tank 3A3 and the conveyor belt 3A5 and is so adapted to coat the degrading agent in contact with the image surface of the recording paper S while being conveyed. The degrading agent coating device 3A4 may use a brush instead of the felt material and, further, it may have a structure being capable of in contact with or apart from the recording paper S.

The conveyor belt 3A5 is laid around the driving pulley 3A6 and the driven pulley 3A7, so that it can be moved in the direction of an arrow shown in the figure on the side carrying the recording paper S when the driving pulley 3A6 is driven by a driving motor not shown in the figure. Further, the conveying speed of the conveyor belt 3A5 can be set to such a level as capable of obtaining a time optimal to the degrading treatment.

There are, further, disposed a temperature/humidity sensor 3A8 above the introduction side of the recording paper S, an ultrasonic humidifier 3A9 behind the sensor 3A8 in the conveying direction of the recording paper S and a ceramic heater 3A10 in a circle made by the conveyor belt 3A5 having the recording paper S thereon at the inside of the degrading section 3A respectively, so that the temperature and the humidity in the degrading section 3A are maintained at a level to promote the biodegradation of the toner.

On the other hand, the drying section 3B comprises a tightly closed space formed with openings on the sides of introducing and discharging the recording paper S like those of the degrading section 3A and a conveyor belt 3B1 extended in the conveying direction of the recording paper S, a heater 3B2 and a blower 3B3 situated thereabove are disposed in the section 3B. In this embodiment, an infrared lamp heater is used as the heater 3B2 by which the degrading agent coated on the recording paper S is dried, and steams formed by the drying are sucked by the blower 3B3 and discharged to the outside by way of a duct 3B4 in which the blower 3B3 is contained.

The duct 3B4 can be connected, if necessary, with a steam processing section and, in this case, only the air, not containing the degrading agent and/or products thereof, is discharged to the outside of the regeneration device.

The cleaning section 3C is a portion for removing the toner set free on the recording paper S by the degradation and drying and it comprises, for example, as shown in FIG. 9, a toner removing member 3C1 that can be in contact with the image surface of the recording paper S in a tightly closed space constituted with a box opened partially at the lower surface, an ultrasonic vibrator 3C2 opposed to the toner removing member 3C1 on both sides of the recording paper S, a cleaning member 3C3 such as a blade or scraper abutting against the circumferential surface of the toner removing member 3C1 and a toner recovery member 3C4.

In this example, a rotary brush is used as the toner removing member 3C1 to wipe off the toner on the recording paper S. Further, the cleaning member 3C3 abuts against the top end of the brush of the toner removing member 3C1 for wiping off the toner deposited to the brush. Further, the toner recovery member 3C4 comprises a paddle wheel in this example for transferring the fallen toner from the fallen position to other positions. The toner recovery member 3C4 is not restricted only to the puddle wheel but it may be, for example, a screw member for transferring the toner.

Further, in the cleaning section 3C, to provide the ultrasonic vibrator 3C2, the conveyor belt for conveying the recording paper S is divided into two parts in a direction of the conveying on both sides of the vibrator 3C2.

In the regenerating treatment means 3 having the constitution as described above, the recording paper S introduced into the print degrading treatment section 3A receives the supply of the degrading agent by the degrading agent coating device 3A2, to undergo the biodegradation of the toner and is dried in the drying section 3B upon completion of the degradation, and the toner degraded and set free from the surface of the recording paper is removed in the cleaning section 3C.

The recording paper carrying, on its surface, a toner comprising biodegradable plastics as the constituent ingredient is introduced into the print degrading treatment section 3A, and the treating ingredients used in this example in the section 3A comprises:

degrading enzyme: Lysoverbs Telemer Lipase (manufactured by Seikagaku Kogyo Co.: Trade name, Lysobspilase).

pH buffer for promotion of degradation: phosphate buffer solution.

In the print degrading treatment section 3A in the regenerating treatment means, temperature is set by the ceramic heater 3A10 for promoting the biodegradation. Specifically, the temperature is controlled to about 37° C. and humidity is set by the ultrasonic humidifier 3A9 for preventing the drying on the surface of the recording paper at that temperature. The temperature and the humidity are controlled by the temperature/humidity sensor 3A8. Further, the temperature setting as described above is not always required for biodegradation as the degradation is possible even at a normal temperature. However, it is preferable to set a temperature to a predetermined level with an aim of easy control for the degrading rate and time.

When the recording paper S is introduced into the print degrading treatment section 3A, the section 3A put under such circumstantial setting, the ports for introducing and discharging the recording paper in the section 3A are closed tightly and, thereafter, the degrading enzyme is coated on the recorded paper S by way of the degrading agent coating member 3A4, and the conveying time is set by the speed of the conveyor belt 3A5 to degrade the toner.

Further, the recording paper S, the toner at the surface thereof being degraded in the conveying period as described above is discharged from the opening on the discharging side of the recording paper in the print degrading treatment section 3A and conveyed to the drying section 3B.

In the drying section 3B, the openings for introducing and discharging sides are closed tightly after the introduction of the recording paper S, the far-infrared heater 3B2 is lit and drying is carried out while determining the conveying time by the conveyor belt 3B1 and then the recording paper S is conveyed to the cleaning section 3C by opening the port on the discharging side.

In the cleaning section 3C, the toner remaining on the recording paper after degradation is set free by the ultrasonic vibrator 3C2 and the toner in this state is wiped off by the toner removing member 3C1 and then removed from the surface of the recording paper S.

On the other hand, the toner deposited to the toner removing member 3C1 is scraped off from the member 3C1 by the cleaning member 3C3 and then recovered by the toner recovery member 3C4.

The recording paper S conveyed through the print degrading treatment section 3A, the drying section 3B and the cleaning section 3C is discharged from the cleaning section 3C and detected for the density at the treated image surface, for example, with the density detecting element 4A shown in FIG. 1 and then sent to the separating means and the storage means.

Figure 10:
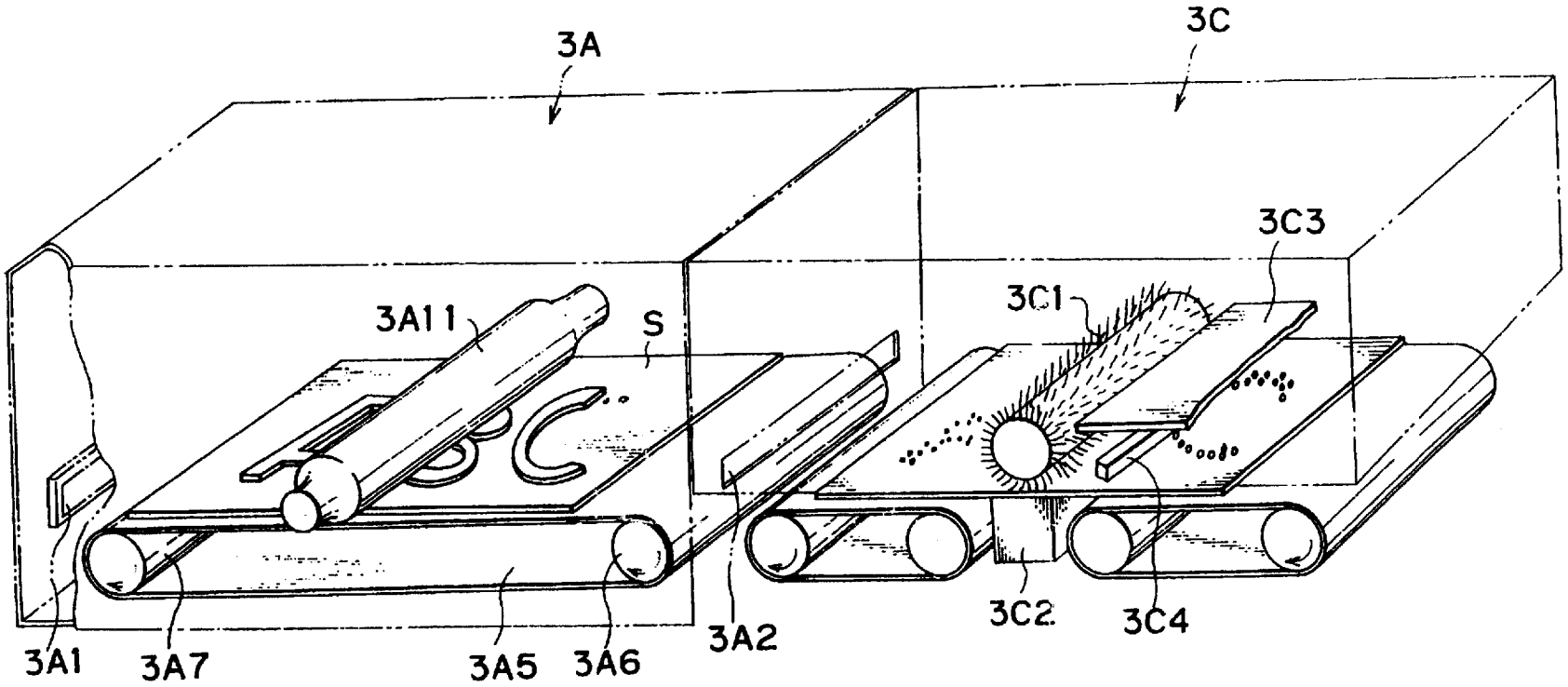
FIG. 10 shows a print degrading treatment section and a cleaning section constituting the regenerating treatment means in the regeneration device for the recording medium printed by a photo-degradable toner.

FIG. 10 shows a regenerating treatment means for regenerating the recording paper S printed by using the toner comprising the photodegradable plastics, it comprises a print degrading treatment section 3A and a cleaning section 3C from the upstream to the downstream in the conveying direction of the paper S.

The print degrading treatment section 3A is used for destroying the property of the toner composed of a photodegradable plastics and eliminating the function of the fixing and depositing property or the like required for the toner, and it comprises, as shown in FIG. 10, a tightly closed space formed with ports 3A1 and 3A2 at the introducing and discharging places of the recording paper S and it further comprises a light irradiation member 3A11 and the conveyor belt 3A5.

For the light irradiation member 3A11, a lamp such as a xenon lamp, mercury lamp, LED or a lamp using laser beam which irradiates a ray containing short wavelength light.

Then, the light irradiation member 3A11 starts lighting in timing with a starting of supply of the recording paper S detected by a detecting member not shown in the figure and irradiates the entire surface of the recording paper S situated in the print degrading treatment section 3A. Further, the conveyor belt 3A5 is laid around the driving pulley 3A6 and the driven pulley 3A7 so that the belt on the side carrying the recording paper S moves in the conveying direction of the recording paper S when the pulley 3A6 is driven by a driving motor not shown in the figure and the belt 3A5, i.e., the paper S, can stay stationary during irradiation of light from the member 3A11. The conveyor belt 3A5 is so adapted that it moves intermittently at a required time interval for the degradation or moves being switched to a lower speed when the entire irradiation can not be applied by the section 3A or partial degradation is applied.

Accordingly, the recording paper S introduced into the section 3A moves in accordance with the setting for the moving speed or the moving state of the conveyor belt 3A5 and can undergo the photodegradation by the light irradiation member 3A11.

In this example, the recording paper S carrying, on its surface, a toner using the photodegradable plastics is introduced into the print degrading treatment section 3A, in which a mercury lamp is used as the light irradiation member 3A11, to irradiate light of a short wavelength.

Then, in the print degrading treatment section 3A although photodegradation can be carried out under a normal temperature, since the reaction rate depends on the temperature, it may also be preferable that temperature control is applied, for example, by placing a ceramic heater 3A10 at the back side of the belt 3A5 carrying the paper S thereon to facilitate the stabilization of the degrading rate and control of the degrading time.

Accordingly, when the recording paper S is introduced into the print degrading treatment section 3A put under such a circumstantial setting, ports for the sides of introducing and discharging the recording paper S in the section 3A are closed tightly and, thereafter, light of a short wavelength is irradiated from the light irradiation member 3A11 and toner is degraded for a period of the conveying time which is set depending on the speed of the conveyor belt 3A5.

Further, the recording paper S having the toner on the surface thereof and being decomposed during the conveying period described above is discharged through the port on the side of discharging of the print degrading treatment section 3A and then conveyed to the cleaning section 3C.

The cleaning section 3C has the same constitution as the section 3C shown in FIG. 9, and the recording paper S is treated in the same manner as explained previously.

FIG. 11 shows a regenerating treatment means for eliminating the images on the recording paper printed by using a toner or ink (hereinafter referred to as the toner or the like) comprising an electron accepting or electron donating color-forming organic compound and a developer therefor as a coloring material by using a color-eliminating agent and it comprises a print degrading treatment section 5A and a drying section 5B from the upstream to the downstream of the conveying direction of the recording paper S.

Namely, the print degrading treatment section 5A is used for eliminating the color of the toner or the like comprising an electron accepting color-forming organic compound or an electron donating color-forming organic compound and a developer therefor and, as shown in FIG. 11, it comprises a color eliminating agent tank 5A1 containing the agent for the toner or the like, a color eliminating agent coating apparatus 5A2 and a color eliminating agent recovery apparatus 5A3.

The color eliminating agent coating apparatus 5A2 has a structure of supplying the color eliminating agent to be described later to the entire printed surface of the recording paper and, specifically, it comprises a coating roller 5A5, made of a rigid material such as metal or an elastic material such as rubber, which rotates and is situated between a coating felt 5A4 incorporated in the color eliminating agent tank 5A1 and the conveying path for the recording paper S, and the color eliminating agent is coated by the roller 5A5 receiving the supply of the color eliminating agent via the coating felt 5A4 incorporated into the tank 5A1 and the roller 5A5 is in contact with the image surface of the recording paper S under conveying. The coating roller 5A5 rotates receiving the driving force of the driving motor 5A5a.

Further, the color-eliminating agent recovery apparatus 5A3 is so made that it can be in contact with the color-eliminating agent coating apparatus 5A2 having the recording paper S therebetween and it comprises a driven roller 5A6 made of a rigid material such as metal or an elastic material such as rubber, a scraper 5A7 abutting to the circumferential surface of the driven roller 5A6 and a recovery tank 5A8 having the roller 5A6 and the scraper 5A7 therein, and recovers the color-eliminating agent remaining on the circumferential surface of the color-eliminating agent coating apparatus 5A2 when the recording paper is not present between 5A5 and 5A6.

On the other hand, the drying section 5B comprises a conveyor belt 5B1 and heaters 5B2 and 5B3 placed vertically on opposite sides of the conveyor belt 5B1 on the side carrying the recording paper, and it dries the recording paper S after being supplied the color-eliminating agent in the print degrading treatment section 5A, the heater 5B2 situated below the recording paper S has a function of drying the recording paper S and, accordingly, it is preferred to use the conveyor belt 5B1 made of highly heat conductive material. Further, in addition to the heater 5B2, the heater 5B3 situated above the recording paper S is used for promoting the drying of the recording paper S in cooperation with the heater 5B2 and keeping it in a reusable state while preventing the occurrence of curl or the like. Since this example is constituted as described above, a recording paper having a printing portion formed with an electrophotographic toner containing an electron accepting color-forming organic compound or an electron donating color-forming organic compound and a developer in a printing device such as a copying machine is conveyed from the paper feed means 2 to the regenerating treatment means 3 as shown in FIG. 1.

Then, in the regenerating treating means 3, the color-eliminating reaction is caused in the print degrading treatment section 5A by coating the color-eliminating agent by the coating apparatus 5A2 in the section 5A of FIG. 11. The color-eliminating reaction is substantially completed just after the coating of the agent and the printed surface of the recording paper S is whitened. Then, in this state, the recording paper S is conveyed to the drying section 5B and is then discharged after evaporation of the remaining color-eliminating agent and then enters into the separating means 4 shown in FIG. 1.

According to this example, since the color-eliminating reaction is completed shortly after coating the color-eliminating agent, it is possible for this color-eliminating regeneration that a great amount of printing surface can be treated in a short period of time and, since the regeneration is completed substantially in an identical time as that of the printing speed on the side of the printing apparatus such as a copying machine, it can provide an effective response capable of rapidly coping with a case resulting in shortcoming of the recording paper on a side of the printing.

On the other hand, in the constitution described above as the example, the color-eliminating agent is supplied to the entire region of the printed surface of the recording paper S, but it may alternatively be adapted so that the color-eliminating agent is supplied only to a limited portion of the printing surface, that is, only to a portion actually deposited with the toner and a like taking consideration for the shortening of the drying time.

Figure 12:
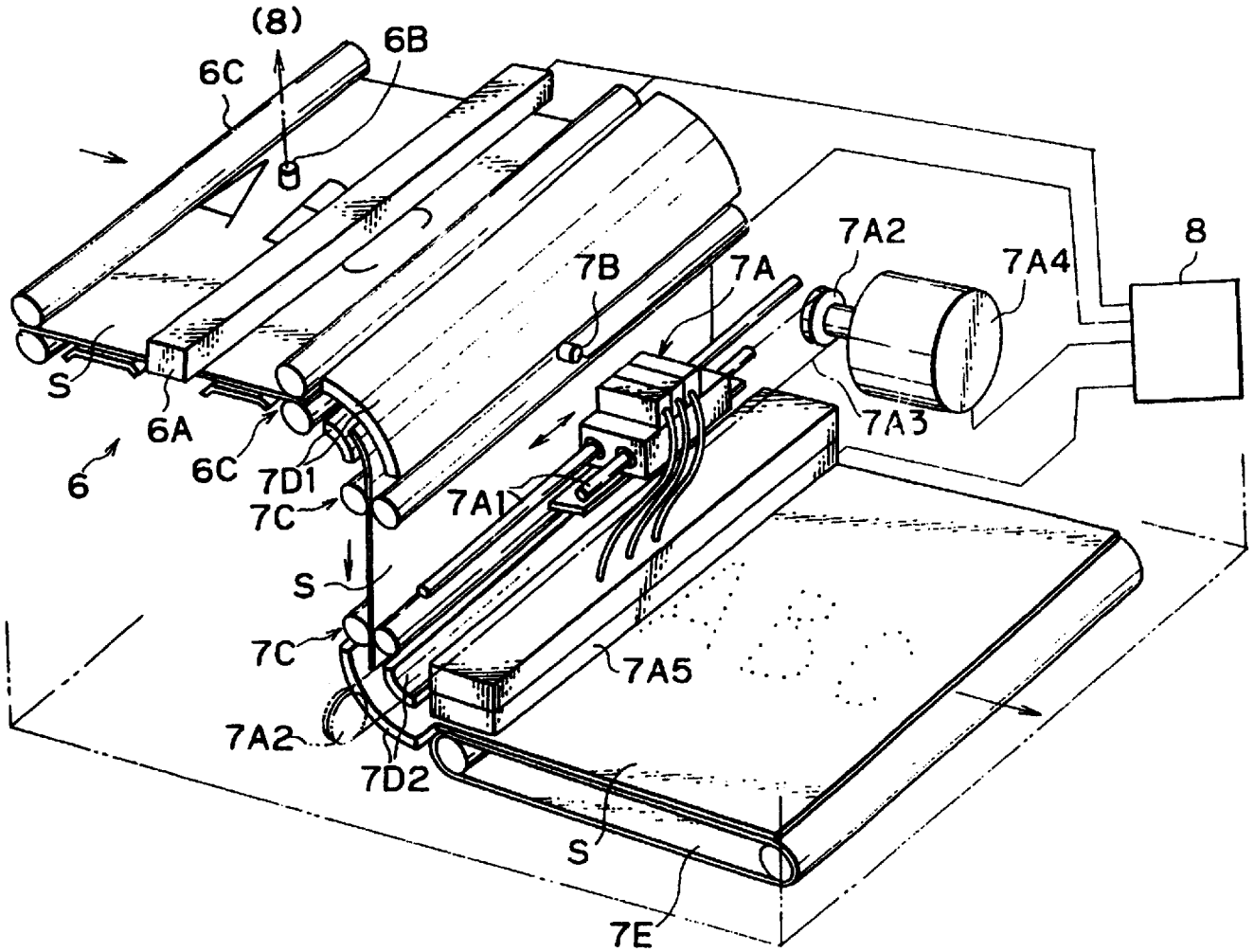
FIG. 12 shows a constitution of using a color-eliminating agent jetting nozzle that moves within a plane in parallel to a surface of the recording medium and in the direction perpendicular to the medium proceeding direction (that is, right and left direction) in the print degrading treatment section, and disposing a detection section for detecting the deposition range and the density of the toner or the ink on the medium before the treatment section.
Figure 13:
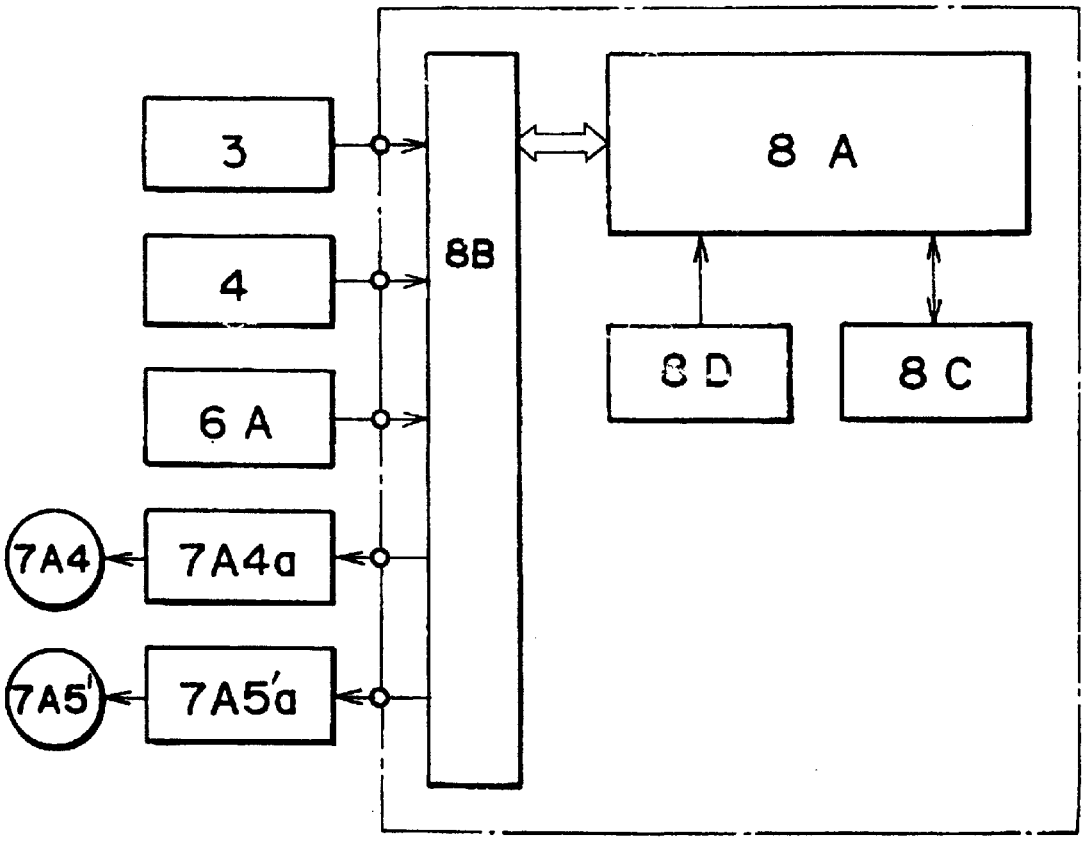
FIG. 13 shows a constitution of a control section in the regeneration device having the print degrading treatment section and the detecting section shown in FIG. 12.

FIG. 12 is a constitutional example as described above, in which the color-eliminating agent is supplied by a spray head.

The structure shown in FIG. 12 comprises a position detecting section 6 for detecting the toner deposited position on the printed surface of the recording paper and a print degrading treatment section 7.

The position detecting section 6 has a charge coupling device (CCD) 6A extended in the lateral direction of the recording paper S as the main portion and detects the position of the toner deposited on the printed surface of the recording paper S under conveyance as the coordinate position and, further, the amount of the deposited toner as the density. Detection by the charge coupled device 6A is started corresponding to the detection for the top end of the recording paper S by the reflection type photosensor 6B situated at the upstream in the conveying direction of the recording paper S.

Further, the recording paper S passing through the position detecting section 6 is turned its conveying path from a horizontal direction to a vertical direction by a guide plate 7D1 and opposes to the print degrading treatment section 7 at the position in the vertical direction.

The print degrading treatment section 7 comprises a spray head 7A capable of moving in the lateral direction of the recording paper S. The spray head 7A is slidable, for example, along two rods 7A1 in parallel with each other in the lateral direction of the recording paper S, and the movement on the rods 7A1 is carried out by an endless belt 7A3 having turn-back portions at pulleys 7A2 situated on both ends of the lateral direction and being secured at the both lateral ends of the surface of the spray head 7A and by a driving motor 7A4 by way of a driving pulley 7A2 situated at one of the turn back portions of the endless belt 7A3. The driving motor 7A4 is controlled by a signal from a control section 8 to be described later.

The spray head 7A has a jetting port opposed to the printed surface of the recording paper S of which conveying direction is converted into a vertical direction and it can jet out a color-eliminating agent instead of an ink having the same structure as an ink jet device of a well-known structure including, for example, a structure using a mechanical principle of jetting out an ink while changing the pressure in an ink chamber by a Vibrator or using a physical principle of extracting through a grid the ink jetted out by the vibrator or by means of an electrostatic force. In the drawing, references 6C and 7C represent pinch rollers respectively. Further, reference 7A5 represents a color-eliminating agent tank and it can incorporate, for example, a pump for charging the color-eliminating agent to the head in the tank 7A5.

The time for jetting the color-eliminating agent from the spray head 7A is set by a driving signal from a control section 8 based on the positional information detected by the charge coupled device 6A in the position detecting section 6.

That is, the control section 8 is adapted to intake the toner deposited position on the coordinate and the toner deposited amount detected by the charge coupled device 6A starting the operation from the instance the top end of the recording paper is detected by the photosensor 6B in the position detecting section 6, takes the intook information into a memory portion and, referring to the conveying speed of the recording paper S in the print degrading treatment section 7, based on the information, determines the jetting time based on a position of the instance a top end of the recording paper detected by the photosensor 7B, gives a driving instruction for jetting the color-eliminating agent when the head 7A is opposed to a portion having the toner and the like on a printed surface of the recording paper and drive the charging equipment for the color-eliminating agent, for example, a pump.

A guide plate 7D2 is disposed at a position subsequent to the passage of the recording paper S before the spray head 7A to convert the conveying path of the recording paper S from a vertical direction to a horizontal direction, and the paper S, changing its direction accordingly is conveyed with the conveyor belt 7E and then discharged through the drying section to the separating means 4.

Since this example is constituted as described above, the mode for supplying the color-eliminating agent can be controlled, and the amount of the agent required for color-elimination can be set by judging the state of the toner deposited to the printed surface of the recording paper and the maximum color-eliminating effect can be obtained by the minimum amount of the agent and this leads to the reduction of the cost for obtaining the regenerated recording paper.

In the structure described above, the spray head is disposed opposing to one side of the recording paper S but it is not restricted only thereto and it is also possible to conduct color-elimination of the recording paper printed on both surfaces thereof by disposing the spray heads on both surfaces of the recording paper.

In accordance with the method of the present invention, the color can be eliminated only for the restricted portion on the printed surface by partially modifying the position detecting section 6 and the control section 8. For instance, when the color is eliminated only for the specified lines on the printed surface and corrected lines are printed there, the printed recording paper, which would otherwise be obliged to be discarded can be reused.

Further, the printing density detecting element 3 in FIG. 4 may be replaced with a reading device and the printed surface before the regeneration is displayed on a display provided in a control section 8 to indicate a portion to be eliminated by eyes using a display pointing apparatus such as an arrow by a light pen, mouse, button or the like and give the indication through the control section to the regenerating section. Although the foregoing descriptions have been made to a method of partially eliminating the image of a toner or the like comprising the electron donating or electron accepting color-forming organic compound and the developer, the regeneration can be attained by the identical principle also by a combination of a toner comprising a photodegradable plastics as the constituent ingredient and an irradiation device for a laser beam or a light beam, or the like, or a toner comprising biodegradable plastics as the constituent ingredient and a jet spray of a degrading agent therefor.

Figure 7B:
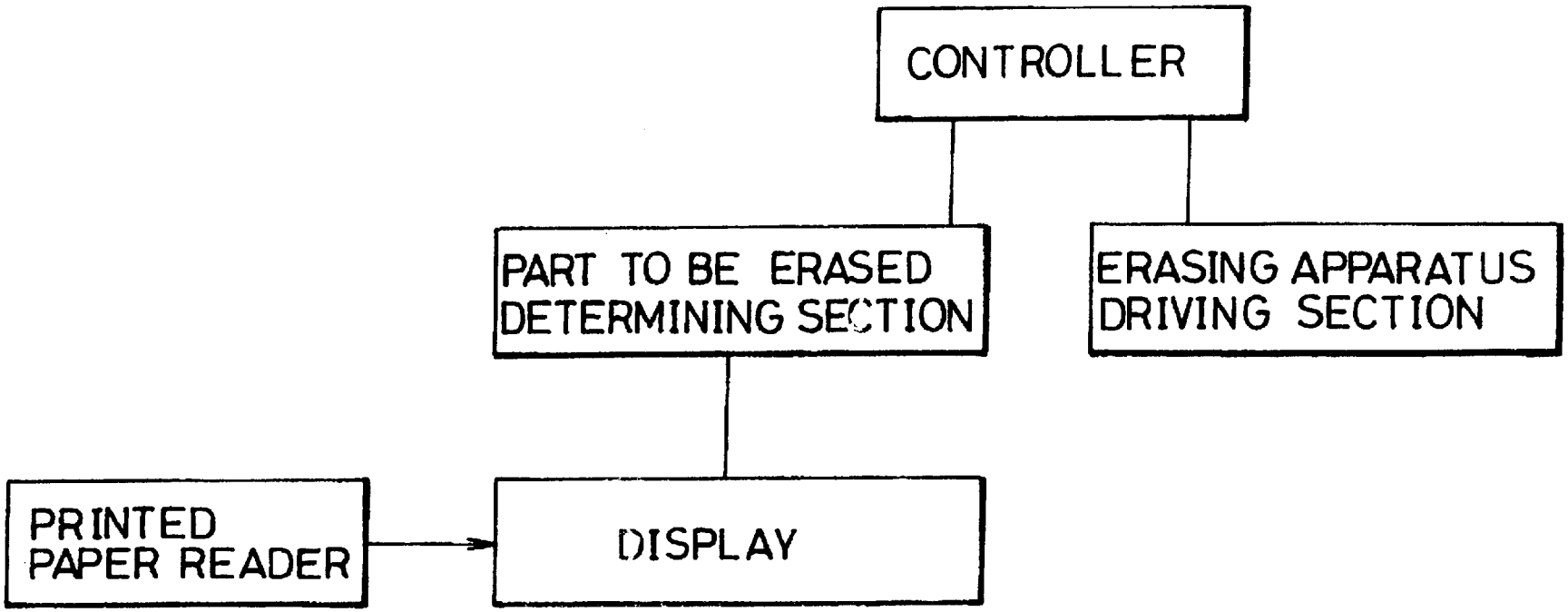
FIG. 7b is a flow diagram illustrating a case instructing a part to be erased on a displayed image as are described with FIGS. 12 and 13.

The above description can also be explained by a block diagram shown in FIG. 7b. The printed recording paper S is supplied by the paper feeding means 1B shown in FIG. 4 and an image thereon is read with a printed paper reader before the regenerating treatment and the image is displayed on a display apparatus disposed in the control section 8. A range, to be eliminated, of the image on the display apparatus is determined by a display pointing apparatus using, for instance, a light pen, mouse or button. The range is input to the controller in the section 8 and it instructs the spray head or a beam irradiation device to move accordingly and the determined range of the image on the paper S is eliminated.

Although the feature of the present invention has been described with reference to the drawings, the drawings are used only for making the contents of the present invention more concretely, more clearly and easily to be understood and the present invention is no way limited only to those illustrated in such drawings. For instance, what is illustrated as the photosensor is not necessarily restricted to the photosensor, so long as it can detect the concentration on the printed surface. Further, the conveyor belt illustrated as the conveying device is not necessarily be a conveyor belt so long as it can convey the recording paper as it is. Furthermore, any of drying methods may be used providing that it can dry a liquid remaining on the treated surface of the recording paper. The foregoings are only a part of examples and other modifications will be apparent per se from the above-mentioned examples.

The toner referred to in the present invention is a finely powderous coloring pigment used for electrography capable of providing chargeability and the toner generally comprises (1) a binder resin, (2) a coring material, (3) a charge controller and (4) a carrier.

(1) For the resin binder, there can be mentioned: homopolymer or copolymer containing styrene or substituted styrene such as polystyrene, chloropolystyrene, poly-α-methylstyrene, styrene-chlorostyrene copolymer, styrene-propylene copolymer, styrene-butadiene copolymer, styrene-vinyl chloride copolymer, styrene-vinyl acetate copolymer styrene-maleic acid copolymer, styrene-acrylic acid ester copolymer (for example, styrene-methylacrylate copolymer, styrene-ethylacrylate copolymer, styrene-butylacrylate copolymer, styrene-phenylacrylate copolymer), styrene-α-methyl chloroacrylate copolymer, styrene-acrylonitrile-acrylate copolymer; vinyl chloride resin, rosin modified maleic acid resin; phenolic resin; epoxy resin; polyester resin; low molecular weight polyethylene; low molecular weight polypropylene; ionomer resin; polyurethane resin; ketone resin; ethylene-ethylene acrylate copolymer; xylene resin; and polybutylbutyral can be exemplified.

(2) As the coloring material, carbon black is most popular and there can be mentioned various other materials such as yellow, red or blue/green color materials. The coloring material is used usually by 0.5 to 40 parts by weight based on 100 parts by weight of the binder resin.

(3) As the charge controller, there can be used negative material such as metal complex salt dye, metal salicylate, metal salt of salicylic acid derivative, and positive material such as nigrosine dye, quaternary ammonium salt and amino acid-containing resin. The charge controller is usually used from 0.05 to 25 parts by weight based on 100 parts by weight of the binder resin.

(4) As the carrier, there can be mentioned, for example, iron oxide powder, Ni—Zn ferrite, Cu—Zn ferrite, Be ferrite, Sr ferrite, ZnO ferrite, glass beads, iron powder, Ni powder, Cu powder, and resin beads and the carrier having a diameter of 10 to 300 μm are usually used.

Recording paper printed with a toner prepared by adding a degradable plastics to the above-mentioned constitutions is one of the targets for regenerating in the regeneration device of the present invention using degradable plastic. The toner is only at the beginning of the use at present and those put to practical use include biodegradable plastics and photodegradable plastics. Although descriptions are mainly made to two kinds of them in the present specification, a recording paper printed with a toner using other degradable component can also be regenerated with the regeneration device according to the present invention when the degradable component is combined with proper degrading agent.

As the biodegradable plastics, there can be mentioned those polymers classified as polysaccharides and they include, specifically, Echoster and Echoster Plus manufactured by Hagiwara Kogyo and they are usually used from 1 to 70 parts by weight based on 100 parts by weight of the binder resin.

As the degrading agent for the toner using biodegradable plastic, there can be mentioned lipase and lipase effecting material. The lipase includes enzymatically decomposing lipase, as well as ester decomposing esterase, phospholipase and lysophoslipase, while the lipase effecting material includes those having the same effect as lipase and there can be exemplified crude lipase, lipase containing material, lipase yielding bacteria and lipase yielding cultural product.

As the photodegradable plastic material, polymers of vinyl ketone type monomers are used and they can include, methyl vinyl ketone, methyl propenyl ketone, t-butyl vinyl ketone, ethyl vinyl ketone, phenyl vinyl ketone, divinyl ketone, acetoxy methyl ketone, chloromethyl ketone, α-acetoxymethyl vinyl ketone, β-chlorovinyl methyl ketone and α-chlorovinyl methyl ketone as the monomer. The polymer of the such vinyl type polymer may be a homopolymer or a copolymer and as the mating monomer in the copolymer, there can be mentioned, for example, ethylene, styrene, methyl methacrylate, α-butyl methacrylate, α-ethylenehexyl methylacrylate, vinyl chloride, α-methylstyrene, acrylonitrile, vinyl acetate and propylene. The plastic material is usually used from 1 to 70 parts by weight based on 100 parts by weight of the binder resin.

Further, the following photodegradation promoter may be used depending on the case. There can be mentioned, for example, aldol-α-naphthylamine condensate, acetyl acetone, metal-iron-diethyldithiocarbamate, salicyl aldehyde, α-mercaptobenzothiazole, metal salt of stearic acid, thiodipropionic acid, iron acetyl acetonate, p-benzoquinone, α-naphthoquinone, anthraquinone and derivatives thereof.

In the above-mentioned photodegradable plastics when constituted as a toner, since the ketone groups effectively absorb light energy under the light irradiation to disconnect —C—C— bonds, the function of the toner such as fixing or depositing property is removed.

Accordingly, as the light source used for the light irradiation, those irradiating light of short wavelength of good adsorbability is preferred and there can be mentioned, for example, an irradiation device such as a xenon lamp and a mercury lamp, as well as a device for short wavelength laser.

Further, as the printing toner on the printed recording paper that can be regenerated by the regenerating device according to the present invention, there can be mentioned, for example, a toner comprising an electron accepting color forming organic compound and a developer.

The electron accepting color-forming organic compound used herein includes those of colorless to pale color, including phthalane and fluorescene and, there can be exemplified the followings. That is, thymolphthalane, phenolphthalane, o-cresol-phthalane, 1,4-dimethyl-5-hydroxybenzene sulfophthalene, m-cresol sulfophthalene, α-naphtholphthalene, o-cresol sulfophthalane, phenolsulfophthalane, fluorescene, sulfofluorescene, tetrabromofluorescene and tetrachlorofluorescene.

As the developer for the electron accepting color-forming organic compound, there can be mentioned, for example, amine such as octyl amine, lauryl amine, stearyl amine, dibutyl amine, tripropyl amine, dimethyl aniline, p-toluidine, β-naphthyl amine, pyridine, picoline, lutidine, quinoline, piperidine, imidazole, triazine and morpholine; quaternary ammonium salts such as tetraethyl ammonium and amino acids such as glycine and alanine.

A printing ink can be prepared in a conventional manner by using the combination of the above-mentioned color forming organic compound and the developer as the coloring material, a general toner can also be prepared in combination of the above compounds with the binder resin, charge controller and carrier described above.

Examples of the color-eliminating agent used for such toners and the like can include, for example, alcohols such as n-octyl alcohol, n-nonyl alcohol, n-lauryl alcohol, n-stearyl alcohol, cyclohexanol, benzyl alcohol, cinnamyl alcohol, ethylene glycol, diethylene glycol, triethylene glycol, propylene glycol, trimethyl propane, pentaerylthritol, sorbitol and mannitol; esters such as octyl acetate, butyl propionate, ethyl laurate, ethyl benzoate, dimethyl phthalate, dioctyl phthalate and dicyclohexyl phthalate, ketones such as benzophenone, methylcyclohexanone, acetonyl acetone and diacetone alcohol, ethers such as diphenyl ether, dioxane, ethylene glycol dibutyl ether and diethylene glycol dibutyl ether, acids amides such as acetoamides and propionic amide, a compound having a phenolic hydroxy group or derivatives thereof and a compound having carboxyl group and derivatives thereof.

The compound having the phenolic hydroxy group and the derivative thereof can include from monophenols to polyphenols and metal salts thereof and the substituents therefor can include alkyl group, aryl group, acyl group, alkoxy carbonyl group and halogen group. Referring more specifically to the compound, there can be mentioned, for example, nonyl phenol, styrenated phenol, α-naphthol, β-naphthol, hydroquinone, butyl p-oxybenzoate, 4,4-methylenediphenyl, bisphenol A, bisphenol S, octyl salicylate and phenol resin. As the metal salts thereof, there can be mentioned, for example, metal salts of the compounds having the phenolic hydroxy group such as sodium, potassium, lithium, calcium, zinc, aluminum, nickel, cobalt, iron, titanium, lead and molybdenum.

Further, as the compound having the carboxyl group and derivatives thereof, there can be mentioned, for example, from monocarboxylic to polycarboxylic acids and substituent derivatives thereof and metal salts thereof. Examples of such compounds include, for example, acetic acid, propionic acid, capronic acid, caprilic acid, lauric acid, mirystic acid, palmitic acid, stearic acid, behenic acid, 12-hydroxy stearic acid, benzoic acid, protocatechuic acid, salicylic acid, phthalic acid, naphthalene diacarboxylic acid, sebatic acid, naphthenic acid and citric acid.

The metal salts thereof can include such as sodium, potassium, lithium, calcium, zinc, aluminum, nickel, cobalt, iron, titanium, lead or molybdenum salt of the carboxylic acids described above.

In the case of using the color-eliminating agent as a liquid, water soluble material is diluted with water and a solvent soluble material is diluted with an organic solvent such as alcohol, acetone or toluene at an optional ratio. Further, the liquid material may be blended with polyvinyl pyrrolidone, ethylene glycol or glycerine so as to obtain an optional viscosity.

Further, a recording paper printed with a toner comprising an electron donating color-forming organic compound instead of the electron accepting color forming organic compound and a developer therefor can also be one object of the regeneration device according to the present invention.

Also for the electron donating color-forming organic compounds, colorless or pale colored materials are used and they are generally classified into diaryl phthalids, aryl phthalids, indolyl phthalids, leuco auramines, rhodamine lactams, spiropyranes, fluoranes, phenothiazines, triphenylmethanes, and aryl furanes and as the compound therefor, there can be mentioned, for example, crystal violet lactone, malachite green lacton, leuco auraminc, rhodamine B lactam, N-3,3-trimethylindolino benzapiropiran, 3-diethylamino-6-methyl-7-chlorofluorane, 3,6-di-p-toluidino-4,5-dimethylfluorane, 3,3-bis(1-ethyl-2-methylindol-3-yl)phthalide, benzoyl leucomethylene blue.

As the developer for the electron donating color forming organic compound, there can be mentioned a compound having a phenolic hydroxy group and a derivative thereof or a compound having a carboxyl group and a derivative thereof.

As the compound having the phenolic hydroxyl group and the derivative thereof, there can be mentioned, for example, from monophenols to polyphenols and the metallic salt thereof, and the substituted compounds, and the substituent thereof can include, for example, alkyl group, aryl group, acyl group, alkoxycarbonyl group and halogen group.

Referring to the compounds, there can be mentioned, for example, nonyl phenol, styrenated phenol, α-naphthol, β-naphthol, hydroquinone, butyl p-oxybenzoate, 4,4-methylene diphenyl, bisphenol-A, bisphenol-S, octyl salicylate and phenol resin. As the metal salts thereof, there can be mentioned metal salt of the compound having the phenolic hydroxy group such as of sodium, potassium, lithium, calcium, zinc, aluminum, nickel, cobalt, iron, titanium, lead and molybdenum.

Further, as the compound having the carboxyl group and derivatives thereof, there can be mentioned, for example, from monocarboxylic to polycarboxylic acids and substituted derivatives and metal salts thereof. As the compound there can be mentioned, for example, capronic acid, caprilic acid, lauric acid, mirystic acid, palmitic acid, stearic acid, behenic acid, 12-hydroxy stearic acid, benzoic acid, protocatechuic acid, salicyclic acid, phthalic acid, naphthalene diacarboxylic acid, sebatic acid and naphthenic acid. As the metal salts therefor, there can be mentioned, for example, metal salts of the carboxylic acid such as of sodium, potassium, lithium, calcium, zinc, aluminum, nickel, cobalt, iron, titanium, lead and molybdenum.

Usual ink or toner can also be prepared by using the combination of the color-forming organic compound and the developer as described above in the same manner as the electron accepting color-forming organic compound.

Examples of the color-eliminating agent used for the toner can include, for example, alcohols such as n-octyl alcohol, n-nonyl alcohol, n-lauryl alcohol, n-stearyl alcohol, cyclohexanol, benzyl alcohol, cinnamyl alcohol, ethylene glycol, triethylene glycol, propylene glycol, trimethyl propane, pentaerylthritol, sorbitol and mannitol; esters such as octyl acetate, butyl propionate, ethyl laurate, ethyl benzoate, dimethyl phthalate, dioctyl phthalate and dicyclohexyl phthalate, ketones such as benzophenone, methylcyclohexanone, acetonitryl acetone and diacetone alcohol, ethers such as diphenyl ether, dioxane, ethylene glycol dibutyl ether, diethylene glycol dibutyl ether, ethylene glycol diethyl ether and diethylene glycol diethyl ether; acid amides such as acetoamide and propionic amid, amines such as octyl amine, lauryl amine, stearyl amine, dibutyl amine, tripropyl amine, dimethyl aniline, p-toluidine, β-naphthyl amine, pyridine, picoline, lutidine, quinoline, piperidine, imidazole, triazine and morpholine; quaternary ammonium salts such as tetraethyl ammonium salt; and amino acids such as glycine and alanine.

What is claimed is:

1. A device, connected to a regeneration device, for selectively separating recording medium, comprising:

means for discriminating whether a regenerated recording medium is reusable; and means for selectively separating the regenerated recording medium into reusable recording medium.

2. A device, connected to a regenerating device having a regenerating section, for selectively separating regenerated recording medium, comprising:

discriminating means connected to said regenerating section for discriminating whether a regenerated recording medium is reusable; and separating means disposed on a downstream side of said discriminating means for selectively separating the regenerated recording medium into reusable recording medium and not reusable recording medium on the basis of the discrimination result of said discriminating means.

3. A device according to claim 1 or claim 2, which further includes means for storing the separated reusable recording medium.

4. A device according to claim 1 or claim 2, wherein the separated recording medium being judged not reusable is conveyed directly to a destroying apparatus.

5. A device according to claim 4, wherein said destroying apparatus is shredder.

6. A device according to claim 1 or claim 2, wherein said discriminating means and said separating means comprise:

a print density detecting element for detecting printed density of the regenerated recording medium;

an apparatus for conveying the medium after the density detection;

a conveying passage switching device for separating the treated recording medium into reusable and not reusable recording medium; and said detecting element being connected to the input of a control section and said switching device being connected to the output of said control section, comparing the result of the detection from said detecting element and a standard print density and setting the position of said switching device in accordance with the result of the comparison.

7. A device according to claim 1 or claim 2, wherein said discriminating means and said separating means comprise:

a print density detecting element for the recording medium before a regeneration treatment;

a printed density detection element for the recording medium after the regeneration treatment;

an apparatus for conveying the recording medium to its destination after the detections of the densities;

a plurality of conveying path switching devices for separating the detected medium as reusable, not reusable and to be regenerated again; and a control section having said detecting and detection elements connected to the input and said switching devices connected to the output, being made to compare the results of the detection by both of the detecting and detection elements and a standard print density and to set the position of each of the switching devices according to the result compared.

8. A device according to claim 6, wherein a conveying distance from the printed density detection element for the recording medium after regenerating treatment to the first conveying path switching device is more than a maximum length of the recording medium to be treated and a detectable width of said detecting element is more than a maximum width of the recording medium to be treated.

9. A device according to claim 6, wherein the regenerated recording medium is judged to be not reusable when a printed density of the recording medium is higher than said standard density and judged to be reusable when the printed density is lower than or equal to said standard density.

10. A device according to claim 6, wherein said standard density is a background density of the recording medium having no print.

11. A device according to claim 6, wherein said print density detecting element is movable to a direction perpendicular to the conveying direction and parallel to a plane of the recording medium.

12. A device according to claim 7, wherein a conveying distance from the printed density detection element for the recording medium after regenerating treatment to a first conveying path switching device is more than a maximum length of the recording medium to be treated and a detectable width of said detecting element is more than a maximum width of the recording medium to be treated.

13. A device according to claim 7, wherein said standard density is a background density of the recording medium having no print.

14. A device according to claim 7, wherein said print density detecting element is movable in a direction perpendicular to a conveying direction and parallel to a plane of the recording medium.

15. The device of claim 1, wherein said means for discriminating discriminates three types of regenerated recording medium as follows:

(1) reusable recording medium;

(2) not reusable recording medium; and (3) recording medium in need of further regeneration.

16. The device of claim 15, further including means for:

(1) feeding recording medium discriminated as reusable to one of a reusable storage location and a printing location;

(2) feeding recording medium discriminated as not reusable to one of a not reusable storage location and a shredding means; and (3) feeding recording medium discriminated as in need of further regeneration to regenerating means.

17. The device of claim 1, wherein said means for discriminating includes control means for determining an end of a discriminating operation to set a timing for opening and closing an outlet of regeneration means disposed upstream of a location at which regenerated recording medium is discriminated.

*18. A method for erasing a printed image formed on a recording medium, comprising the steps of:*

*erasing the printed image formed on the recording medium for regenerating the recording medium;*

*detecting a residual image of the recording medium regenerated by said erasing step;*

*discriminating whether the regenerated recording medium is reusable or not reusable based on a detecting result of said detecting step; and*

*selectively separating the regenerated recording medium into a reusable recording medium.*

*19. A method according to claim 18, wherein said detecting step detects a residual image density of the regenerated recording medium.*

*20. A method according to claim 18, wherein said discriminating step discriminates three types of the regenerated*

*recording medium as a reusable recording medium, a not reusable recording medium, and a recording medium in need of further regeneration.*

*21. A method according to claim 18, wherein said discriminating step discriminates a reusable recording medium from another recording medium.*

*22. A method according to claim 18, wherein said discriminating step discriminates a reusable recording medium from a not reusable recording medium.*

*23. A method according to claim 18, wherein said discriminating step discriminates a reusable recording medium from a recording medium in need of further regeneration.*

*24. A method for erasing a printed image formed on a recording medium and regenerating the recording medium to be reusable, comprising the steps of:*

*erasing the printed image formed on the recording medium for regenerating the recording medium;*

*detecting a regenerating result of the recording medium regenerated by said erasing step; and*

*selectively separating and storing the regenerated recording medium into a reusable recording medium and a not reusable recording medium based on a detecting result of said detecting step.*

*25. A system for erasing a printed image formed on a recording medium and regenerating the recording medium, comprising:*

*a regenerator which erases the printed image formed on the recording medium;*

*a detector disposed downstream of the regenerator in a recording medium moving direction, and which detects the regenerating result of the recording medium regenerated by the regenerator;*

*a discriminator which discriminates whether the regenerated recording medium is reusable or not reusable; and*

*at least one separator disposed downstream of the detector in the recording medium moving direction, and which separates the recording medium discriminated by the discriminator into a reusable recording medium and another recording medium.*

*26. A system according to claim 25, wherein said detector detects a residual image density of the regenerated recording medium.*

*27. A system according to claim 25, wherein said separator comprises a switching pawl.*

*28. A system for erasing a printed image formed on a recording medium and regenerating the recording medium, comprising:*

*a regenerator which erases the printed image formed on the recording medium;*

*a detector disposed downstream of the regenerator in a recording medium moving direction, and which detects whether the recording medium regenerated by the regenerator is reusable, not reusable, or in need of a further regeneration process by the regenerator;*

*at least one separator disposed downstream of the detector in the recording medium moving direction, and which separates the regenerated recording medium into a reusable recording medium, a not reusable recording medium, and a recording medium in need of a further regeneration process by the regenerator on the basis of a detection result of the detector; and*

*a conveyor which conveys the recording medium in need of a further regeneration process by the regenerator separated by said at least one separator to the regenerator.*

*29. A system according to claim 28, wherein said detector detects a residual image density of the regenerated recording medium.*

*30. A system according to claim 28, wherein said separator comprises a switching pawl.*

*31. A system according to either one of claim 25 or claim 28, further comprising a stocker which stocks respectively the reusable recording medium and the not reusable recording medium separated by said at least one separator.*

*32. A regenerating system comprising:*

*a regenerating section which erases a printed image formed on a recording sheet;*

*a residual image detecting device disposed downstream of the regenerating section in a recording sheet moving direction, and which detects a residual image remaining on the recording sheet after a regenerating process by said regenerating section;*

*a controller which compares the residual image remaining on the recording sheet, without being erased after the regenerating process by said regenerating section, detected by said residual image detecting device with a standard image data, and which determines the recording sheet to be reusable or not reusable on the basis of the comparing result of the residual image;*

*a stocker which stocks the reusable recording sheet; and*

*a conveying pass switch disposed downstream of the residual image detecting device in the recording sheet moving direction, and which switches the conveying direction of the recording sheet determined to be reusable based on the comparing result in said controller to a direction of the stocker.*

*33. A system according to claim 32, wherein said conveying pass switch further switches the conveying direction of the recording sheet determined to be in need of a further regeneration process by said regenerating section on the basis of the comparing result in said controller to a direction of the regenerating section, and said regenerating section erases the residual image on the sheet determined to be in need of a further regeneration process by said regenerating section on the basis of the comparing result in said controller.*

*34. A method for reusing a recording medium, comprising the steps of:*

*discriminating whether a regenerated recording medium is reusable; and*

*selectively separating the regenerated recording medium into a reusable recording medium.*

*35. A method according to claim 34, wherein said discriminating step discriminates three types of the regenerated recording medium as a reusable recording medium, a not reusable recording medium, and a recording medium in need of further regeneration.*

*36. A method according to claim 34, wherein said discriminating step discriminates a reusable recording medium from another recording medium.*

*37. A method according to claim 34, where said discriminating step discriminates a reusable recording medium from a not reusable recording medium.*

*38. A method according to claim 34, where said discriminating step discriminates a reusable recording medium from a recording medium in need of further regeneration.*

*39. A method for a regeneration system having a regenerating section, for selectively separating a regenerated recording medium, comprising the steps of:*

*discriminating whether the regenerated recording medium is reusable; and*

*selectively separating the regenerated recording medium into a reusable recording medium and a not reusable recording medium on the basis of a discrimination result of said step of discriminating.*

*40. A system for erasing a printed image formed on a recording medium and regenerating the recording medium, comprising:*

*a regenerating device which erases the printed image formed on the recording medium;*

*a discriminating device disposed downstream of the regenerating device in a recording medium moving direction, and which discriminates whether the recording medium regenerated by the regenerating device is reusable or not reusable; and*

*a separating device which separates the recording medium discriminated by the discriminating device into a reusable recording medium and a not reusable recording medium.*

*41. A system for erasing a printed image formed on a recording medium and regenerating the recording medium, comprising:*

*a regenerating device which erases the printed image formed on the recording medium;*

*a discriminating device disposed downstream of the regenerating device in a recording medium moving direction and which detects whether the recording medium regenerated by the regenerating device is reusable, not reusable, or in need of a further regeneration process by the regenerating device;*

*a separating device disposed downstream of the discriminating device in the recording medium moving direction, and which separates the recording medium into a reusable recording medium, a not reusable recording medium, and a recording medium in need of a further regeneration process by the regenerating device on the basis of the discrimination result of the discriminating device; and*

*a conveying device which conveys the recording medium in need of a further regeneration process by the regenerating device separated by said regenerating device to the regenerating device.*

*42. A system according to either one of claim 40 or claim 41, further comprising a stocker which stocks respectively the reusable recording medium and the not reusable recording medium separated by said separating device.*

*43. A regenerating system comprising:*

*a regenerating section which erases a printed image formed on a recording sheet;*

*a detecting element disposed downstream of the regenerating section in a recording sheet moving direction, and which detects a residual image remaining on the recording sheet after a regenerating process by said regenerating section;*

*a control section which compares the residual image remaining on the recording sheet, without being erased after the regenerating process by said regenerating section, detected by said detecting element with a standard image, and which determines the recording sheet to be reusable or not reusable based on a comparing result of the residual image;*

*a stocker which stocks the reusable recording sheet; and*

*a conveying pass switching section disposed downstream of the detecting element in the recording sheet moving direction, and which switches the conveying direction of the recording sheet determined to be reusable based on the comparing result in said control section to a direction of the stocker.*

*44. A system according to claim 43, wherein said conveying pass switching section further switches the conveying direction of the recording sheet determined to be in need of a further regeneration process by said regenerating section on the basis of the comparing result in said control section to a direction of the regenerating section, and said regenerating section erases the residual image on the sheet determined to be in need of a further regeneration process by said regenerating section on the basis of the comparing result in said control section.*

*45. A system for erasing a printed image formed on a recording medium and regenerating the recording medium, comprising:*

*a regenerator which erases the printed image formed on the recording medium;*

*a detector disposed downstream of the regenerator in a recording medium moving direction, and which detects a regenerating result of the recording medium regenerated by the regenerator;*

*a discriminator which discriminates whether the regenerated recording medium is reusable or not reusable; and*

*a stocker disposed downstream of the detector in the recording medium moving direction, and which stocks respectively the recording medium discriminated by the discriminator into a reusable recording medium and a not reusable recording medium.*

* * * * *